(12) United States Patent
Itako

(10) Patent No.: US 6,393,140 B1
(45) Date of Patent: May 21, 2002

(54) PAPER-LIKE PIECE IDENTIFYING METHOD AND DEVICE

(75) Inventor: Eiji Itako, Sakado (JP)

(73) Assignee: Nippon Conlux Co., Ltd., Tokyo (JP)

( * ) Notice: Subject to any disclaimer, the term of this patent is extended or adjusted under 35 U.S.C. 154(b) by 0 days.

(21) Appl. No.: 09/060,550

(22) Filed: Apr. 15, 1998

(30) Foreign Application Priority Data

Apr. 16, 1997 (JP) .............................................. 9-115195

(51) Int. Cl.$^7$ .............................. G06K 9/00; G06K 9/62; H04N 7/18
(52) U.S. Cl. .............................. 382/135; 382/228; 902/6
(58) Field of Search ........................... 382/135, 137–40, 382/228; 902/7, 6; 209/534; 356/71; 194/210, 212, 213; 73/159

(56) References Cited

U.S. PATENT DOCUMENTS

| | | | |
|---|---|---|---|
| 4,592,090 A | * 5/1986 | Curl et al. | 382/7 |
| 4,881,268 A | * 11/1989 | Uchida et al. | 382/7 |
| 5,077,805 A | * 12/1991 | Tan | 382/7 |
| 5,199,543 A | * 4/1993 | Kamagami et al. | 194/207 |
| 5,295,196 A | * 3/1994 | Raterman et al. | 382/7 |
| 5,437,357 A | * 8/1995 | Ota et al. | 194/206 |
| 5,542,518 A | * 8/1996 | Kurosawa et al. | 194/206 |
| 5,751,840 A | * 5/1998 | Raterman et al. | 382/135 |
| 5,923,413 A | * 7/1999 | Laskowski | 356/71 |
| 6,026,175 A | * 9/2000 | Munro et al. | 382/135 |

FOREIGN PATENT DOCUMENTS

| | | |
|---|---|---|
| JP | 58-9990 | 2/1983 |
| JP | 63-26918 | 6/1988 |
| JP | 64-5354 | 1/1989 |
| JP | 2-148383 | 6/1990 |
| JP | 3-292589 | 12/1991 |
| JP | 4-102187 | 4/1992 |
| JP | 6-195543 | 7/1994 |

* cited by examiner

Primary Examiner—Amelia M. Au
Assistant Examiner—Martin Miller
(74) Attorney, Agent, or Firm—Morrison & Foerster LLP

(57) ABSTRACT

Detected data for a plurality of predetermined positions on a particular bill to be identified are each converted into relative-value data to a minimum value of the detected data for the individual positions, to extract a characteristic pattern of designs printed on the bill. The relative-value data are normalized by use of a relative value standard average to provide adjusted sample data. Then, for each of the positions, a distance value indicating how many times a difference of the adjusted sample data from the standard average is greater than a standard deviation (namely, standardization variable) is evaluated, to effect further normalization. The bill is then identified by judging whether or not the thus-normalized adjusted sample data, i.e., distance value for each of the positions, falls within a predetermined determination-standard-value range. Further, the distance values for the individual positions may be summed up to provide a totalized distance value, and the totalized distance value may be compared to a predetermined determination standard value to identify the bill. Provision of an approximate denomination table achieves increased identification accuracy in relation to two or more denominations that are approximate to each other. By previously setting determination standard data in relation to a particular denomination for which false bills may be frequently encountered, such false bills can be eliminated reliably with increased efficiency.

27 Claims, 13 Drawing Sheets

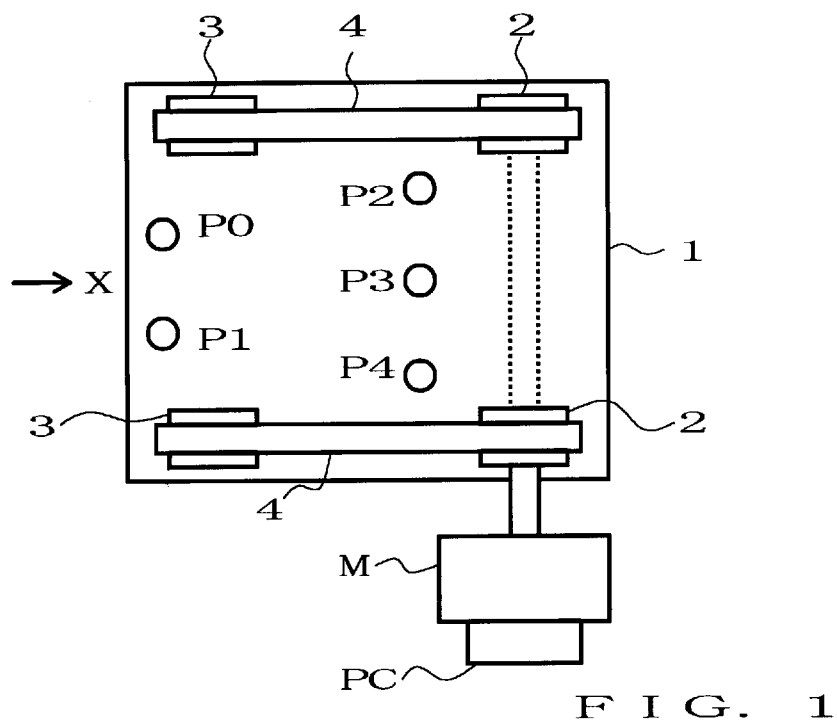
F I G. 1
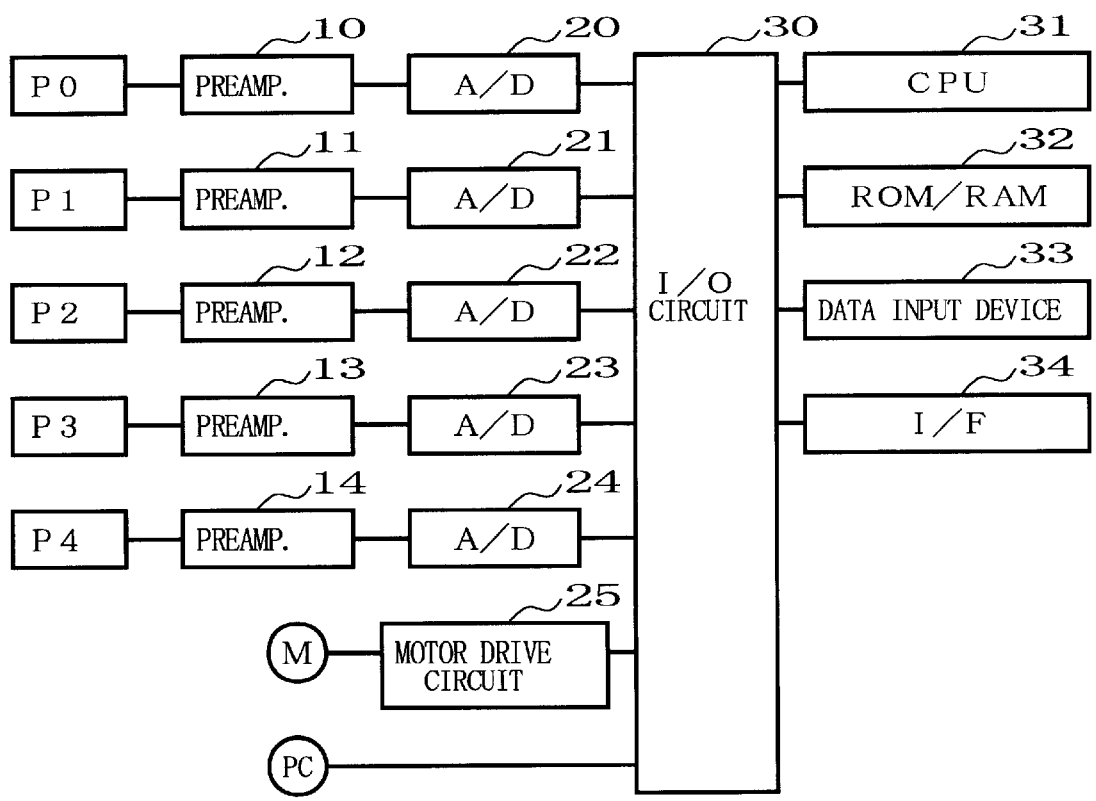
F I G. 2

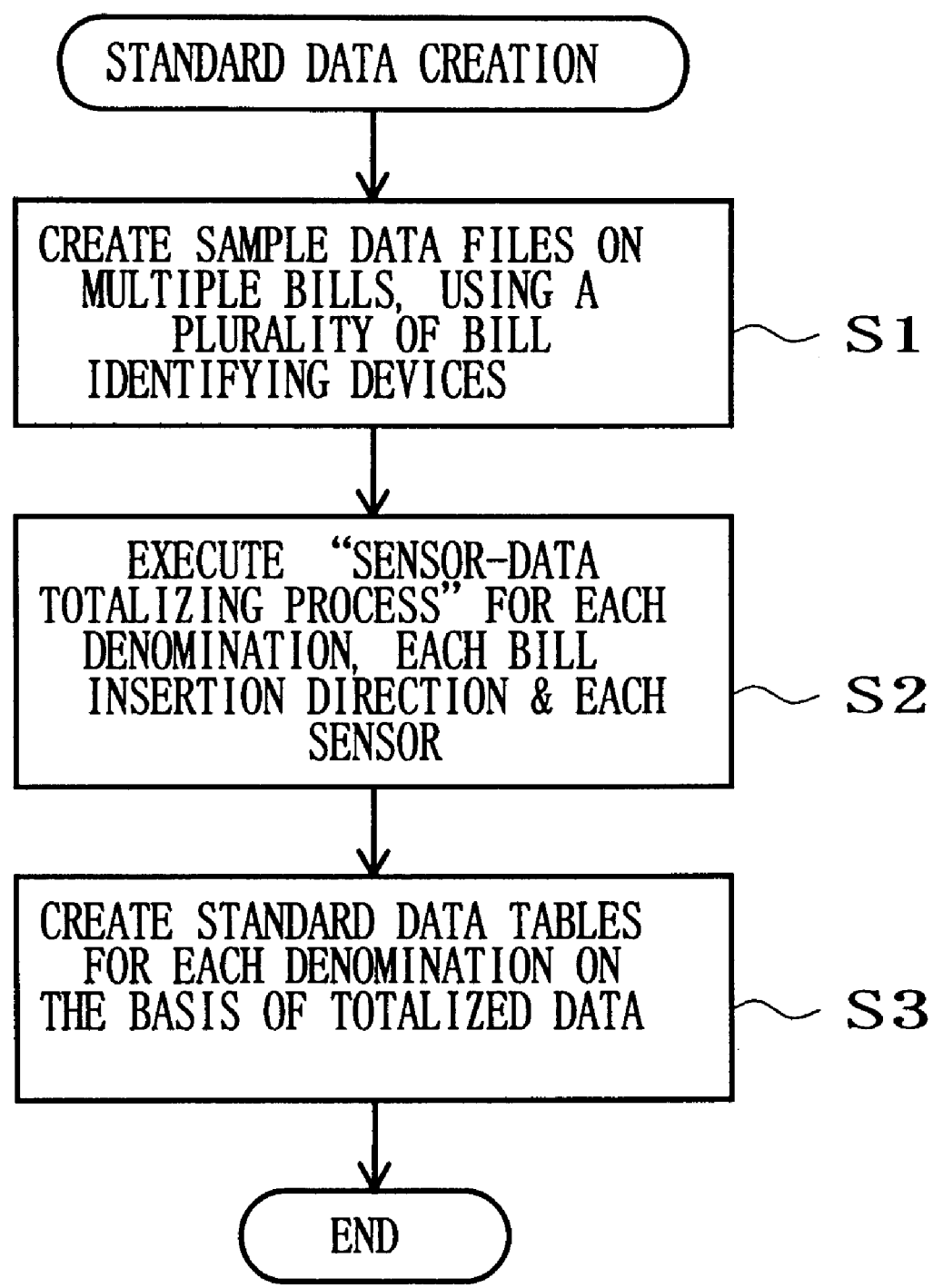
F I G. 4

PAPER-LIKE PIECE IDENTIFYING METHOD AND DEVICE

BACKGROUND OF THE INVENTION

The present invention relates generally to bill identifying devices for use in automatic bending machines, money changing machines, game machines and the like, and more particularly to a paper-like piece identifying method and device for validating (i.e., testing authenticity of) a variety of paper-like pieces, such as bills (bank notes), checks, credit slips, tickets and securities, having distinctive designs or patterns (drawings, characters, etc.) borne on their surfaces as by printing.

Bill identifying or validating devices are known from, for example, Japanese Patent Publication Nos. SHO-63-26918 and SHO-64-5354, which are designed to acquire sample data or detected data by use of sensors to identify types and densities of colors on various regions of a bill as well as magnetic powder contained in the bill in synchronism with transport of the bill and then compare the thus-acquired detected data to a known standard pattern to thereby determine the authenticity or genuineness of the bill. In these known bill identifying devices, an "authentic bill" signal for a given denomination is issued only when all the data sampled from individual positions of the bill fall within an allowable tolerance from the known standard pattern for the denomination. Reliability of the thus-identified denomination and authenticity depends only on an evaluated difference between values of the detected data for each of the positions and the standard pattern data. Thus, in order for the bill identifying devices to reliably exclude false bills, it is necessary to set a considerably narrow tolerance as the determination standard; however, too-narrow tolerances could result in the problem that an authentic bill is erroneously determined to be "false" even when values of detected data for the individual positions have been shifted uniformly by presence of a large stain on the virtually whole surface of the bill.

Further, in the case of bills, such as U.S. dollar bills, having closely similar or approximate printed designs among various denominations, the tolerances for the different denominations would often overlap, which would therefore prevent accurate identification of the bills.

Japanese Patent Publication No. SHO-58-9990 proposes an improved bill identifying device, which is designed to compare detected data for the individual positions to a standard pattern after modifying or adjusting the detected data by use of an average of the data, in order to appropriately deal with undesirable variations in detected data due to stains and aging of a bill and drift of detected data values due to ambient temperature variations. But, the proposed bill identifying device would also erroneously determine and reject an authentic bill as false when the bill has a partial stain thereon presenting a partial detected data variation. Further, Japanese Patent Laid-open Publication No. HEI-2-148383 proposes another improved bill identifying device which prestores relations between standard data and frequency distribution data for each denomination and makes the bill identification on the basis of the fuzzy logic. But, the proposed bill identifying device can not appropriately deal with stains and aging of bills, sensors, etc., because, even when there has occurred a variation in detected data themselves, no specific adjustment is made at all to retain their correspondence with the frequency distribution data.

Because a multiplicity of detected data are generally necessary for accurate identification of denomination and authenticity of a bill, it has been conventional to use optical and magnetic sensors in combination, which, however, would require separate determination circuits for the optical sensors and magnetic sensors, thereby making the overall structure of the device very complex.

Other bill identifying techniques pertinent to the present invention are known from Japanese Patent Laid-open Publications Nos. HEI-3-292589 and HEI-4-102187.

According to the approach disclosed in the HEI-3-292589 publication, sensor-detected data are averaged for subsequent normalization of the data, a ratio of the average value of the sensor-detected data to a predetermined standard average value is determined as an adjustment coefficient, and then the data normalization is effected by multiplying the sensor-detected data by the determined ratio. However, the data normalization employed here is a very simple one and hence would be adversely influenced by various error factors such as stains on individual sensors employed, different operating characteristics and assemblage errors of the sensors and stains on individual bills to be tested.

According to the approach disclosed in the HEI-4-102187 publication, each bill to be tested is divided into a plurality of regions or blocks, a difference is calculated between an average value of detected data for each of the blocks and standard average value data for that block, and the thus-calculated differences for the individual blocks are summed. The sums of such differences are calculated for all denominations, and then one of the denominations for which the calculated sum is the smallest is determined as the denomination of the tested bill. However, because the differences are calculated from an average of absolute values of the detected data, this approach would present the drawback that identification accuracy tends to be poor because bills to be tested have different types and degrees of stains and the like.

SUMMARY OF THE INVENTION

It is therefore an object Of the present invention to provide a paper-like piece identifying method and device capable of validating a paper-like piece with increased accuracy by minimizing determination errors that would be caused by detected data variations due to aging of and partial stains on a paper-like piece and by eliminating adverse influences of determination errors due to unique errors and aging of bill-characteristic detecting sensors.

It is another object of the present invention to provide a paper-like piece identifying method and device which achieve appropriate normalization of sample data detected via characteristic-detecting sensors, by performing accurate data adjustment based on extraction of printed design characteristics from the sample data.

It is still another object of the present invention to provide a paper-like piece identifying method and device which achieve accurate validation of a paper-like piece in consideration of uniqueness of the paper-like piece, using statistical totalization of sample data.

It is still another object of the present invention to provide a paper-like piece identifying method and device which can perform validation of paper-like pieces as accurately as possible even when the paper-like pieces are closely similar in design borne thereon.

It is still another object of the present invention to provide a paper-like piece identifying method and device which can perform high-accuracy validation of a paper-like piece only with an optical sensor, without using a magnetic sensor.

According to a first aspect of the present invention, there is provided an paper-like piece identifying method which comprises: a first step of detecting characteristics of a particular paper-like piece to be identified by use of a sensor, to provide detected data for a plurality of predetermined positions on the paper-like piece; a second step of converting the detected data for each of the predetermined positions into relative value data to a predetermined value; a third step of normalizing the relative value data by use of a predetermined normalization parameter, to thereby provide adjusted sample data for each of the predetermined positions; and a fourth step of statistically evaluating the adjusted sample data for each of the predetermined positions by use of a standard average and standard deviation previously set for each of the predetermined positions, to thereby identify the paper-like piece.

By converting the detected data from the sensor into relative value data, it is possible to provide data representative of an extraction of characteristic printed designs on the surface of a paper-like piece (i.e., data corresponding to "variation pattern data Dp(I)" in the later-described preferred embodiment). Further, normalizing the relative value data in the above-mentioned third step provides adjusted sample data (i.e., data corresponding to "CDATA(I)" Dp(I) in the later-described preferred embodiment). Such normalization of the relative value data achieves an appropriate data normalization taking into account an unique error of the sensor used and uniqueness of each paper-like piece (such as a stain or wrinkle on whole or part of the paper-like piece). In the above-mentioned fourth step, the adjusted sample data for each of the positions is statistically evaluated using a standard average (parameter corresponding to a "scan position standard average HMXADR(I) in the later-described preferred embodiment") and standard deviation (parameter corresponding to a "scan position standard deviation HMSADR(I) in the later-described preferred embodiment"). Such a statistical evaluation significantly enhances the identification accuracy and hence would be useful, in particular, when used for identification of bills, such as U.S. dollar bills, having relatively similar printed design patterns among different denominations.

In a preferred implementation, the above-mentioned second step may include a step of selecting, as the predetermined value, a minimum or maximum value of the detected data for the individual predetermined positions, and the detected data for each of the predetermined positions may be converted into relative value data to the selected minimum or maximum value.

Further, the above-mentioned third step may include: a step of calculating an average value of the relative value data for the predetermined positions; a step of using, as the normalization parameter, a predetermined relative standard average relating to the average value of the relative value data, to calculate a ratio of the average value to the relative standard average as an adjustment coefficient; and a step of executing arithmetic operations for adjusting the relative value data for each of the predetermined positions to thereby provide the adjusted sample data for each of the predetermined positions.

High-accuracy normalization is achieved by thus converting the detected data from the sensor into relative value data to a minimum or maximum value of the detected data and executing arithmetic operations for adjusting, i.e., normalizing the relative value data using, as an adjustment coefficient, a ratio of the average value of the relative value data to a predetermined relative standard average.

In addition, the above-mentioned fourth step may include: a step of, for each of the predetermined positions, executing an arithmetic operation for dividing a difference between the adjusted sample data and the standard average by the standard deviation, to thereby convert the adjusted sample data into a normalized distance value; and a step of evaluating the normalized distance value for each of the predetermined positions in accordance with a predetermined determination standard. With the arrangement, sample data for each of the predetermined positions on the paper-like piece is normalized or standardized in the form of a distance value based on the standard average and standard deviation, which serves to facilitate determination operations on the paper-like piece and also increase the identification accuracy.

The term "distance value" as used in this specification is chosen only for convenience of description and can not be said to be an established or accepted term in the field of statistics. Here, the term "distance value" is used to only indicate, in a specific numerical value, how far given sample data differs or deviates from the standard average in terms of a multiple of the standard deviation. Therefore, the term "distance value" may be replaced by a "standardization variable" as commonly used in the field of statistics. Thus, the distance value of the adjusted sample data based on the sensor output represents, in normalized or standardized form, a distance of the sample data from the standard average (corresponding to the "scan position standard average HMXADR(I)" in the later-described preferred embodiment) for each of the predetermined positions on the paper-like piece.

Accordingly, the distance value represents, in normalized form, degree of approximation to the standard average, and a smaller distance value represents a greater approximation to the standard average. Thus, the paper-like piece to be identified can be evaluated appropriately by comparing the distance value to a predetermined determination standard or criterion value (corresponding to a "scan position determination magnification PMST" in the later-described preferred embodiment). Namely, the predetermined determination standard value represents an upper limit of the distance value range defining an acceptable authentic paper-like piece, and if the distance value of the paper-like piece is greater than the determination standard value, the piece will be identified to be non-authentic or false and rejected. Because the distance value is a normalized value, a same or common determination standard value can be applied to distance values for all scan positions of a single sensor. As a consequence, it is possible to considerably simplify creation and storage format of determination standard data. Ultimate standard to be used for finally accepting the paper-like piece as authentic or rejecting it as false may be set optionally. Each paper-like piece may be determined to be authentic if the distance values for all the scan positions of a sensor satisfies a predetermined determination standard and may be determined to be false otherwise, although any other suitable alternative can be applied. Because the determination standard comprises a single value, it can be readily adjusted, which would permit easy adjustment of identifying sensitivity. As a result, the present invention achieves greatly-facilitated adjustment of sensitivity for identifying paper-like pieces.

Introducing the concept of "totalized distance value" as a parameter for the paper-like piece identification should be very advantageous. The totalized distance value (corresponding to a value "TOD" in the later-described preferred embodiment) can be calculated by summing normalized distance values for the individual positions. The paper-like piece can be validated by statistically evaluating the totalized distance value by use of previously-set statistical standard data. An example of such statistical standard data may be acquired by: evaluating a totalized distance value standard average (corresponding to an average "RTXXX" in the later-described preferred embodiment) and totalized distance value standard deviation (corresponding to a deviation "RTSIG" in the later-described preferred embodiment) on the basis of a totalized distance value obtained from a multiplicity of sample paper-like piece; evaluating a limitary value of standardization variable therein by simulation; and then creating a totalized distance value determination standard value (corresponding to a "totalized distance value determination magnification TMST" in the later-described preferred embodiment). Use of the thus-acquired single totalized distance value for the paper-like identification is very useful for increased identification accuracy. For example, when there has been made a primary judgement that a given paper-like piece corresponds to (i.e., falls in known characteristics) two or more sorts (denominations), one of the sorts (denominations) for which the piece enjoys highest evaluation can be selected by use of the totalized distance value, and thus the totalized distance value can be advantageously used to identify only one actual sort (denomination) of the paper-like piece.

For example, in identification of bills, such as U.S. dollar bills, having relatively similar printed design patterns among different denominations, more reliable identification among the different denominations would be achieved by employing a more stringent determination standard; however, in such a case, it is possible that even authentic bills are often erroneously rejected as not satisfying the stringent determination standard due to aging of and stains on the bills. Further, it has been conventional to use a magnetic sensor, in combination with an optical sensor, to identify respective denominations of bills on the basis of a difference in magnetic content in the printing ink used, which, however, would considerably increase production costs because of the additional provision of the magnetic sensor.

In view of the above-discussed inconvenience encountered by the conventional approach, the present invention is based on an optional design employing a not-so-stringent determination standard or employing only an optical sensor rather than a combination of optical and magnetic sensors, and is characterized by allowing a situation that the primary determination judges a given paper-like piece as corresponding to two or more sorts in an overlapping manner and executing a predetermined secondary determination after such a primary determination to thereby even more increase the identification accuracy.

The present invention can significantly increase the identification efficiency by carrying out the identification by reference to a previously arranged table that stores therein information indicative of a plurality of sorts of paper-like piece approximate to each other in characteristics presented by the sensor detected data.

When the paper-like piece has been judged as corresponding to two or more sorts in an overlapping manner, the secondary determination may be effected in a mode where one of the sorts for which the piece enjoys highest evaluation is selected as the sort of the piece, or alternatively in such a mode where the paper-like piece is determined as false and rejected. Which of the modes should be employed may be set for each combination of predetermined approximate sorts.

Further, in view of the fact that dexterously-made false bills of some large denomination are often encountered, the inventor also proposes a novel solution to eliminate such dexterously-made false bills. Namely, according to the present invention, determination standard data for dexterously-made false paper-like pieces as well as determination standard data for authentic paper-like pieces are previously arranged and stored in memory or the like. When a particular paper-like piece has been determined as satisfying the determination standard data for false paper-like pieces in addition to the determination standard data authentic paper-like pieces, the particular paper-like piece is determined to be false and rejected. This way, the present invention can eliminate such dexterously-made false bills in an appropriate and reliable manner.

The present invention can be arranged and practiced as a paper-like piece identifying device as well as a paper-like piece identifying method. Further, where the present invention is implemented using a computer, it can be practiced as a recording medium containing a paper-like piece identifying program run by the computer.

BRIEF DESCRIPTION OF THE DRAWINGS

For better understanding of the above and other features of the present invention, the preferred embodiments of the invention will be described in greater detail below with reference to the accompanying drawings, in which:

FIG. 1 is a schematic plan view showing an exemplary general arrangement of a bill identifying device employed to practice the present invention;

FIG. 2 is a block diagram showing a general hardware setup of the bill identifying device of FIG. 1;

FIG. 4 is a flow chart of a "standard data creation process" in accordance with an embodiment of the present invention;

DETAILED DESCRIPTION OF THE PREFERRED EMBODIMENTS

[Overview of Bill Identifying Device]

Figure 3A:
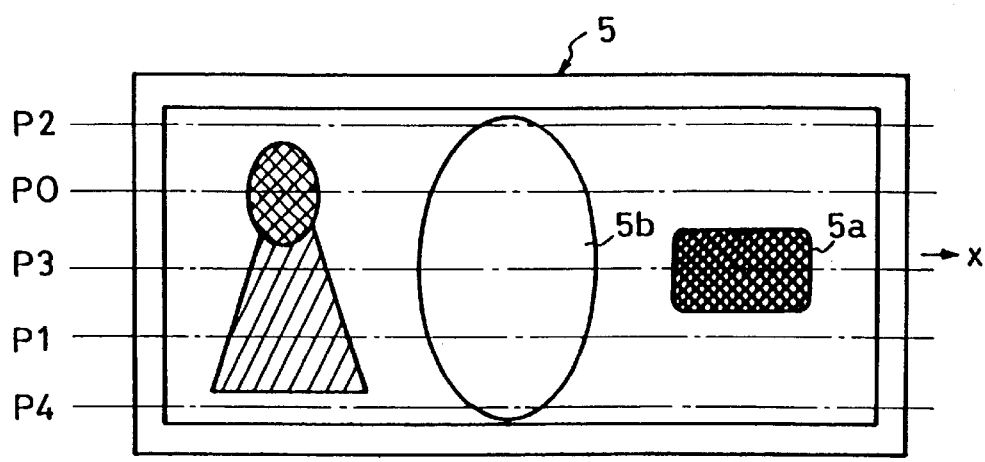
FIG. 3A is a plan view of a bill showing an exemplary design borne on its surface.

FIG. 1 is a schematic plan view showing a bill transport mechanism and sensors of a bill identifying device to which a bill identifying method of the present invention is applied, and FIG. 2 is a block diagram showing a general setup of a controller section in the bill identifying device of FIG. 1.

In FIG. 1, the bill transport mechanism comprises two conveyor belt mechanisms that are disposed on opposite sides of a rectangular plate 1 forming a bill travel path, and each of the conveyor belt mechanisms includes a timing belt 4 passed around a drive timing pulley 2 and a driven timing pulley 3. The drive timing pulleys 2 on the opposite sides of the bill travel path are rotated by a drive motor M to transport an inserted bill on the travel path. Pulse coder PC outputs a "rotation detection" signal per rotation of the motor M. A plurality of (e.g., five) bill-detecting optical sensors P0 to P4 are positioned in a predetermined arrangement, and each of the sensors P0 to P4 is a transmission-type optical sensor that includes a pair of light emitting and receiving elements disposed, in opposed relation, above and below the bill travel path formed on the plate 1 and outputs an electrical signal corresponding to an amount of light transmitted through an inserted bill. The direction in which a bill is inserted and transported in the bill identifying device is from left to right in FIG. 1, as denoted by arrow X.

As shown in FIG. 2, an analog output signal from the light receiving element of each of the sensors P0–P4 is sent via a preamplifier 10–14 to a corresponding A/D converter 20–24, where it is converted into digital data. Output of each of the A/D converters 20–24 is coupled via an input/output circuit 30 to a CPU 31. In a memory 32 including a ROM, non-volatile RAM and working RAM, there are prestored control programs for sequenced operations of the bill identifying device and judgement on bills, as well as various standard (preset) data necessary for determination on each of the inserted bills. At the stage of creating the various standard data necessary for determination on each of the tested bills, a standard data creating program is also installed in the memory 32.

The CPU (Central Processing Unit) 31 runs the programs in the memory 32, to carry out data totalization for preliminary creation of standard data, subsequent inserted-bill determination and various other operations, as will be detailed hereinafter. Data input device 33 including a keyboard is used for manual entry of necessary data and commands by a user. The motor M, functioning as a drive source for the conveyor belt mechanisms, is controlled by the CPU 31 via a motor drive circuit 25 and the input/output circuit 30, and rotation detection signal from the pulse coder PC is given via the input/output circuit 30 to the CPU 31. Reference numeral 34 represents an input/output interface (I/F) through which signals are communicated with an automatic vending machine, game machine or the like employing the bill identifying device.

The standard data creating program is normally loaded in a particular device of a manufacturer authorized to manufacture the bill identifying device of the invention, rather than in the bill identifying device after having been supplied to an user. In the authorized manufacturer's device, a process for totalizing a multiplicity of data necessary for judgement on bills and the like is carried out in the following sequence on the basis of the standard data creating program. This preliminary data totalizing process is performed using a plurality of the bill identifying devices under various conditions and environments and the collected data are finally arranged or totalized by a central computer system (not shown), so that a variety of standard data are prepared on the basis of the finally arranged results. Then, tables containing these standard data are factory-loaded in a ROM or non-volatile RAM, and a bill identifying device having stored such standard data in tables of the memory 32 is supplied to an user. Alternatively, the standard data may of course be created by the user using the standard data creating program.

The sensors P0 and P1 disposed near a bill inlet of the bill identifying device are used to detect insertion of a bill into the device. Namely, once the tip of the inserted bill enters between the light emitting and receiving elements of the sensors P0 and P1, amounts of light detected by the light receiving elements of the sensors P0 and P1 decrease, by which the insertion of the bill can be detected. Upon detection of the bill insertion, the motor is rotated in a forward direction to start taking in the inserted bill, and then light transmissivity at predetermined positions of the inserted bill is detected by the individual sensors P0 to P4 in synchronism with rotation detection signals each of which is output from the pulse coder PC for each rotation of the motor M. As shown, the sensors P0 to P4 are disposed in a staggering fashion with respect to a direction transverse to the bill transport direction (arrow X), so as to detect transmitted-light amount patterns (those of printed designs and watermarks).

Figure 3B:
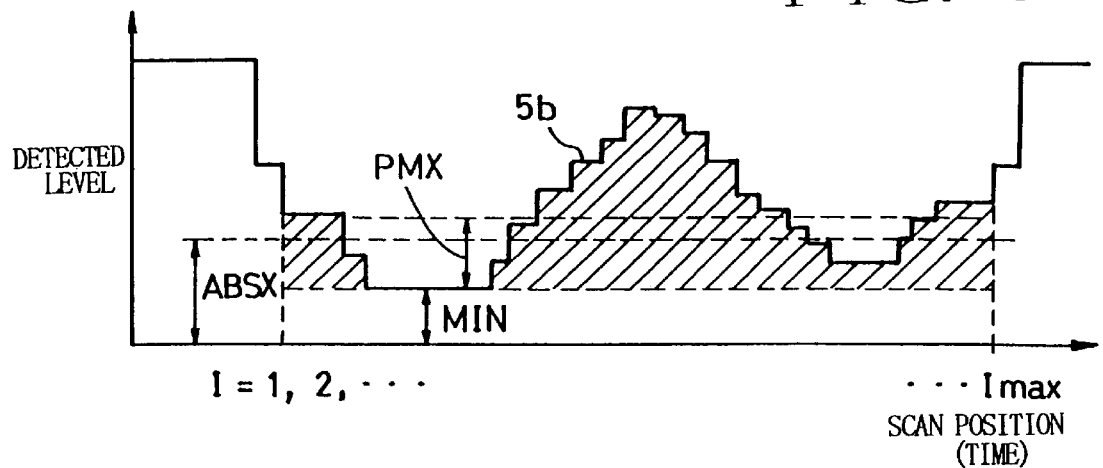
FIG. 3B is a diagram showing an example of variation in detected data acquired by one of a plurality of sensors.

FIG. 3A is a plan view of a bill 5, where scanning lines of the sensors P0 to P4 over the bill are denoted by dot-and-dash lines. FIG. 3B shows an example of variation in detection signal levels of one of the sensors (e.g., sensor P3), where the vertical axis represents absolute values of the detection signal levels (detected levels) converted in digital form and the horizontal axis represents scan positions (or scan time). Namely, FIG. 3B shows exemplary digital values of output signals of the sensor P3 at various scan positions that are identified on the basis of rotation detection signals from the pulse coder PC. In the following description, each of the scan positions is represented by "I" which takes any of values 1, 2, 3, . . . , "predetermined maximum value" (denoted by Imax). In the example of FIG. 3, reference numeral 5a represents a region located along the scanning line of the sensor P3, which is a darkest printed region that therefore presents a lowest transmissivity level MIN, and reference numeral 5b represents a region that contains a watermark and presents a relatively high transmissivity level. Absolute value of the lowest transmissivity level MIN would vary depending on various factors such as a large stain extending virtually along the full length of the bill 5, or unique error or aging of the sensor. Obliquely hatched regions in FIG. 3B reflect a variation pattern of the designs on the bill 5. Thus, for each of the sensors P0 to P4, there is presented a unique transmitted-light amount pattern of the designs (printed designs and watermarks) along its scanning line.

[Outline of Standard Data Creation]

Now, a description will be made about a process for creating various standard data necessary for judgement on bills.

FIG. 4 is a flow chart outlining the process for creating various standard data necessary for judgement on bills.

Step S1: Collection of Sensor Data on Multiple Sample Bills

At first step S1, sensor data (i.e., data detected by the sensors P0 to P4) on a multiplicity of bills are collected under various environments and conditions using a plurality of the bill identifying devices as arranged in the above-mentioned manner, so as to create a multiplicity of sample data files. Namely, here, a multiplicity of bills are inserted in the bill identifying devices under different environments and conditions such as different temperature conditions and then data detected of the inserted bills by the sensors P0 to P4 are stored as sample data files into a hard disk or the like, to provide for sample data collection taking into account assembly errors and unique errors of the individual sensors P0 to P4 used in the bill identifying devices. As the sample bills, a multiplicity of authentic bills satisfying various requirements are prepared for each of several denominations, such as bills produced at different authorized plants, new or unused bills and stained circulating bills. The bill identifying devices are connected to a central host computer system via, for example, serial communication lines, and sensor data detected by the individual bill identifying devices are transmitted to the host computer system for storage in a hard disk or the like as sample data files. In this case, various other pieces of information are of course also additionally stored, which include those representing the identified denomination and inserted direction of each of the bills and identifying the sensors P0–P4 used.

Step S2: Sensor-Data Totalizing Process

At next step S2, the host computer system runs a predetermined sensor-data totalizing program (as will be detailed in relation to FIGS. 5A and 5B) to execute a predetermined sensor-data totalizing process on the multiplicity of sample data collected in the above-mentioned manner. This sensor-data totalizing process is executed for each of several denominations (e.g., one-dollar bill, five-dollar bill and ten-dollar bill), for each of possible bill insertion directions (i.e., a direction where the bill is inserted from the left edge thereof with the obverse side facing upward, a direction where the bill is inserted from the right edge thereof with the obverse side facing upward, a direction where the bill is inserted from the left edge thereof with the reverse side facing upward, and a direction where the bill is inserted from the right edge thereof with the reverse side facing upward), and for each of the five sensors P0–P4; that is, the sensor-data totalizing process is executed for each of possible combinations of the denomination, bill insertion direction and sensor. Stated otherwise, at this step, the sensor-data totalizing process is executed for one of the possible combinations, i.e., on data detected for one of the denominations, one of the bill insertion directions and one of the sensors. As one example, the sensor-data totalizing process is performed on data detected by the "sensor P3" when "one-dollar bill" was inserted "from its left edge with the obverse side facing upward". The sensor-data totalizing process for one of the possible combinations is carried out on the basis of a multiplicity of (say, 7,000) sample data files; in other words, a predetermined multiplicity of (say, 7,000) sample data files are collected at step S1 mentioned above.

Figure 5A:
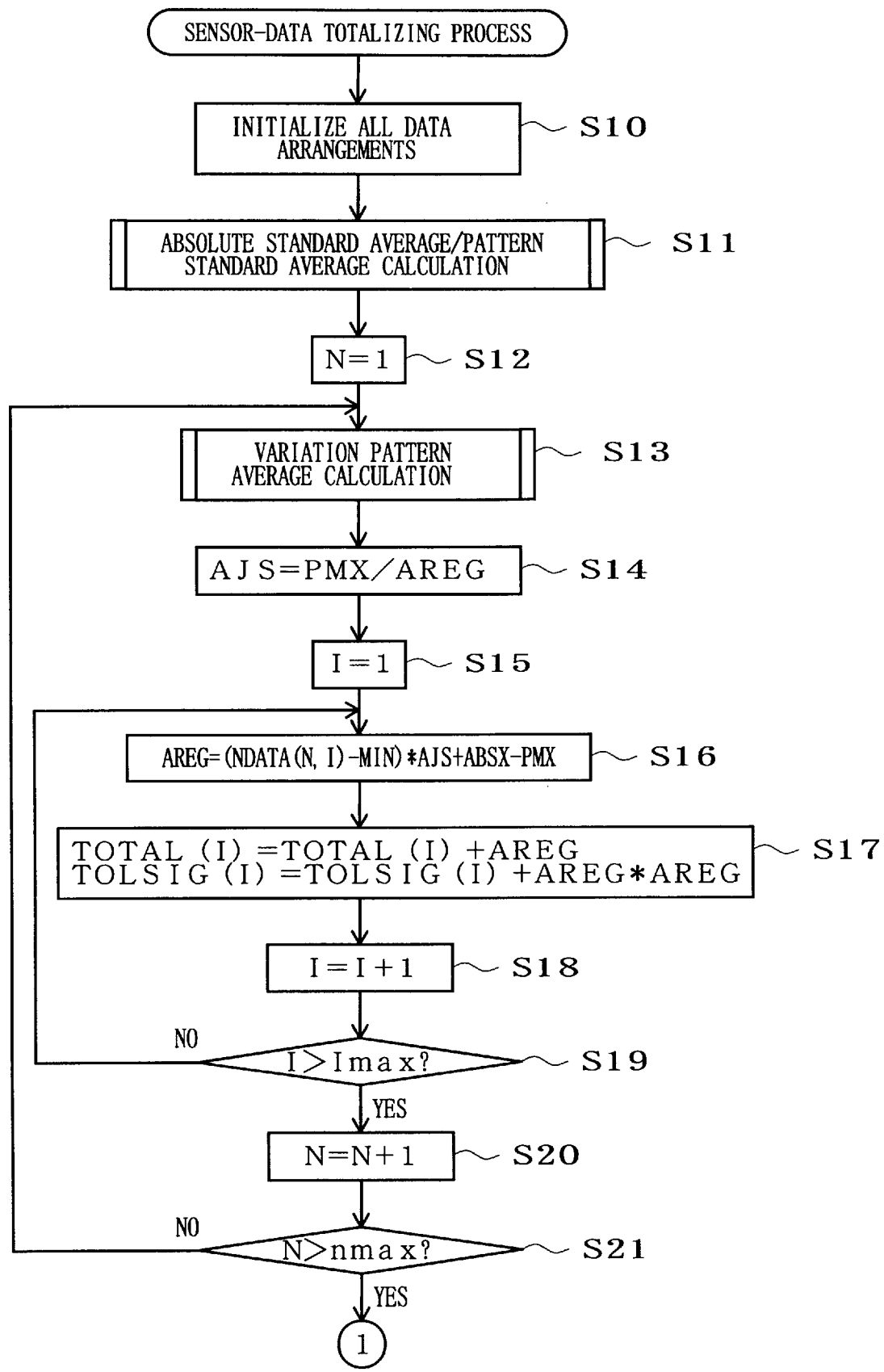
FIGS. 5A and 5B are flow charts showing an example of a main routine of a "sensor-data totalizing process" in accordance with an embodiment of the present invention.
Figure 5B:
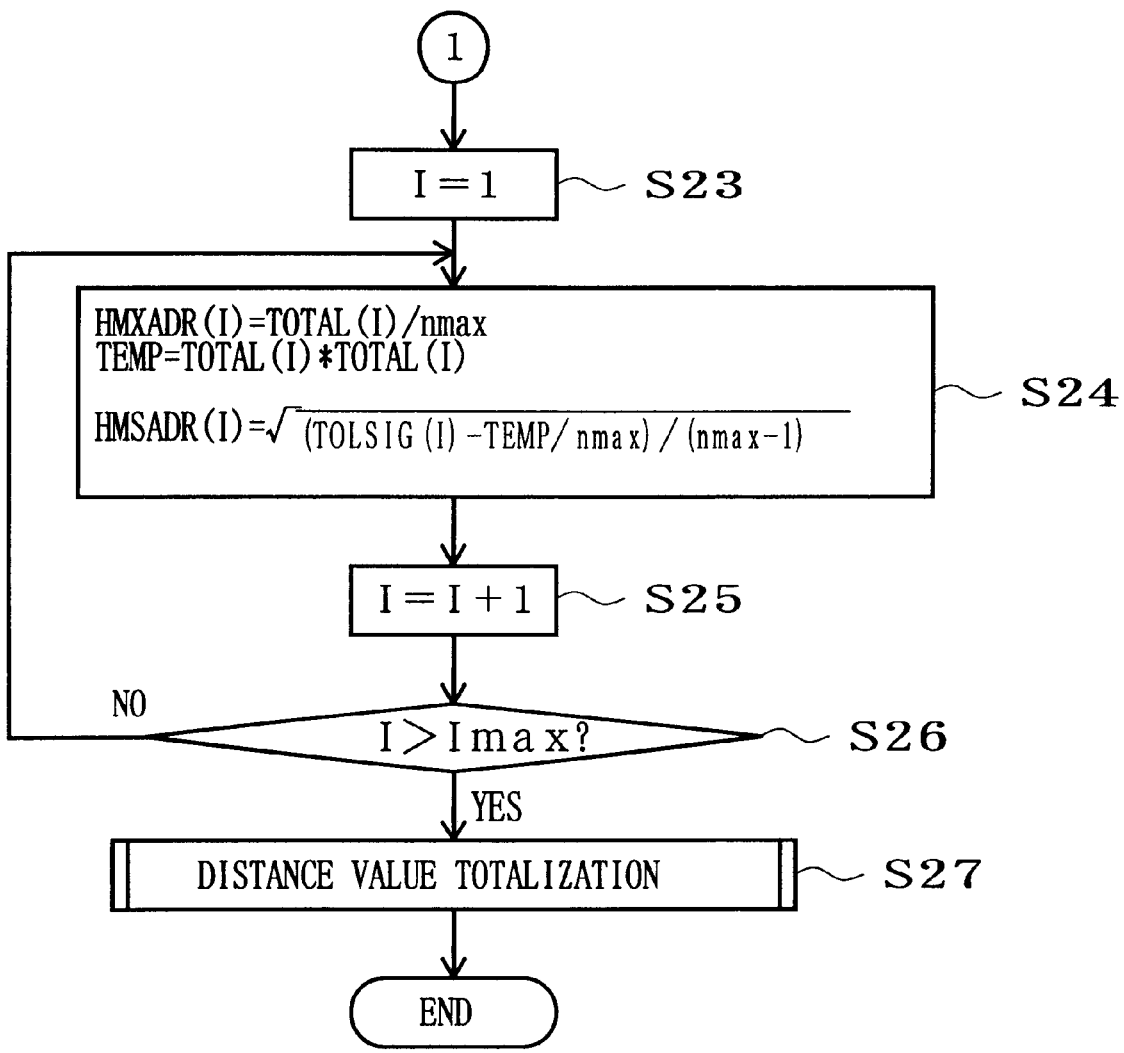

Thus, at step S2, the sensor-data totalizing process is, in effect, executed on a total of 60 combinations in relation to the above-mentioned three denominations, four bill insertion directions and five sensors. However, because the same step sequence as shown in FIGS. 5A and 5B can apply to each of the combinations, the sensor-data totalizing process for only one of the combinations will be described later with reference to FIGS. 5A and 5B.

Step S3: Creation of Standard Data Tables

At this step, various sorts of standard data necessary for judgement on bills are created for each of the possible combinations (i.e., in relation to each of the denominations, each of the bill insertion directions and each of the sensors) on the basis of totalized results acquired at the preceding step S2, and the created standard data are tabled and stored into the ROM or the like. Details of the standard data will be described later.

[Outline of Sensor-Data Totalizing Process]

Figure 7:
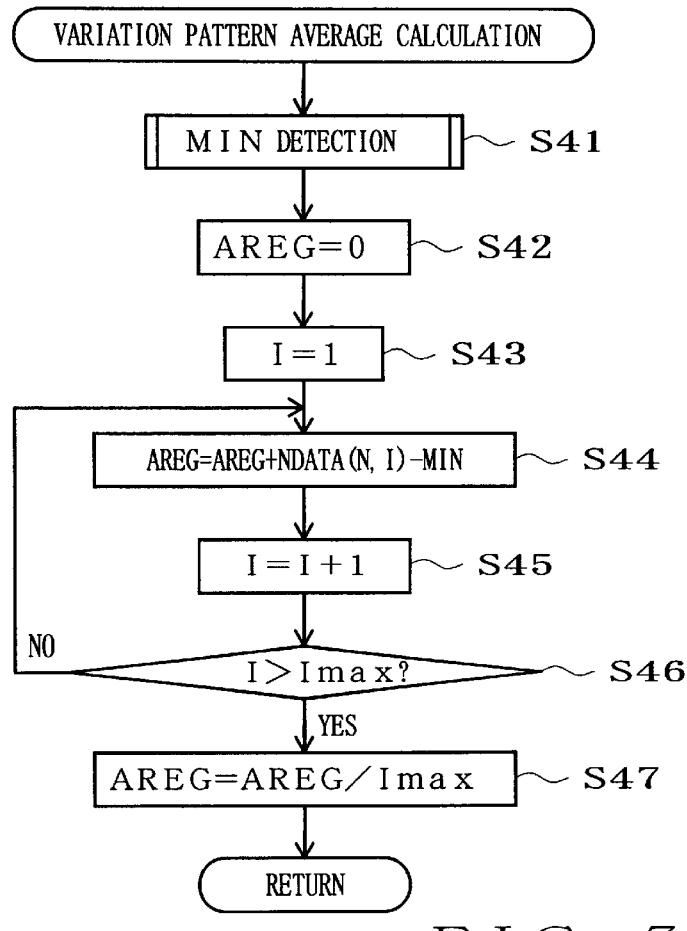
FIG. 7 is a flow chart showing an example of a "variation pattern average calculation" subroutine carried out in the main routine of FIG. 5.
Figure 8:
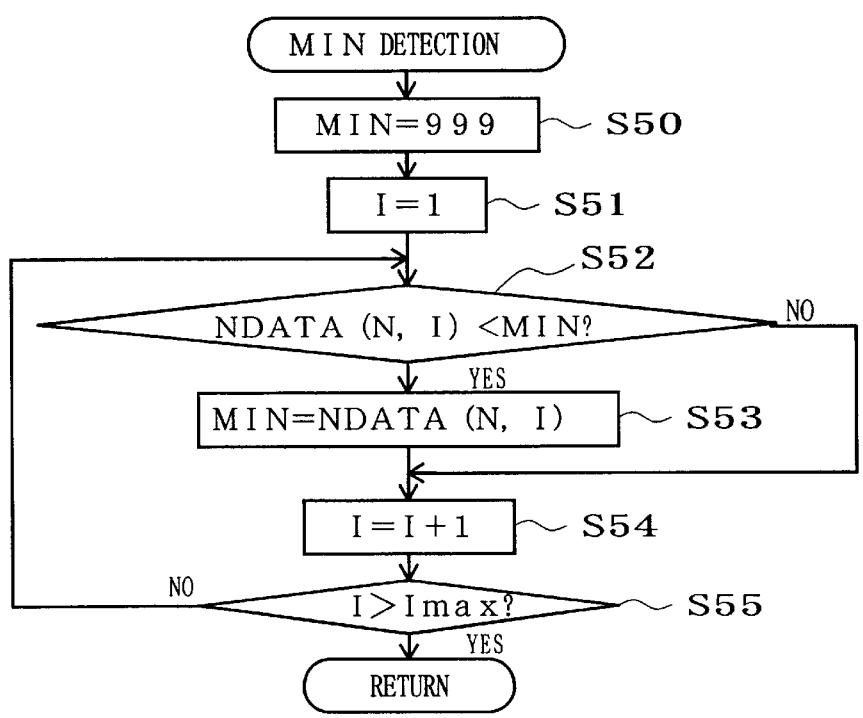
FIG. 8 is a flow chart showing an example of a "minimum value (MIN) detection" subroutine carried out in the main routine of FIG. 5.
Figure 9A:
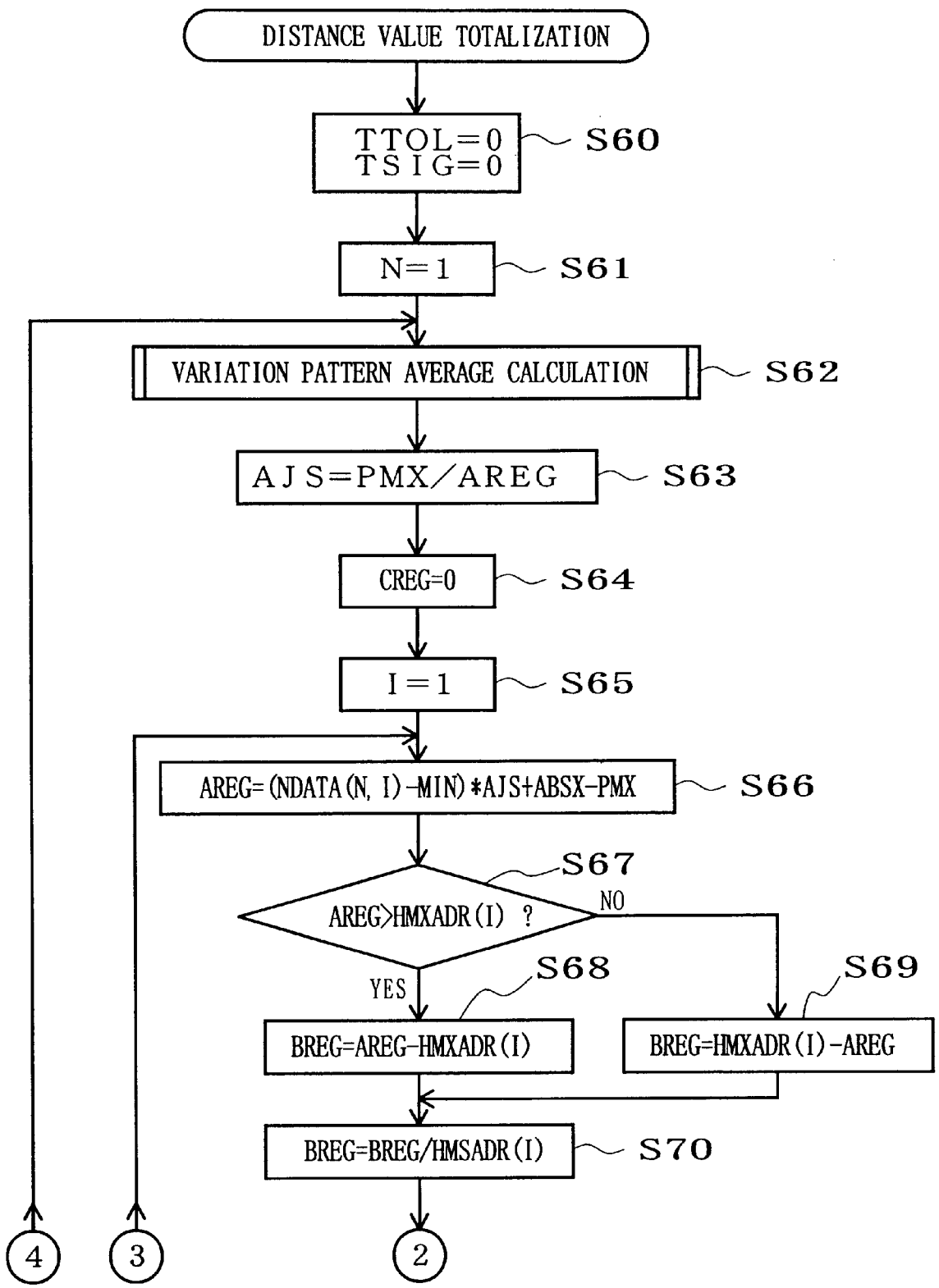
FIGS. 9A and 9B are flow charts showing an example of a "distance value totalization" subroutine carried out in the main routine of FIG. 5.
Figure 9B:
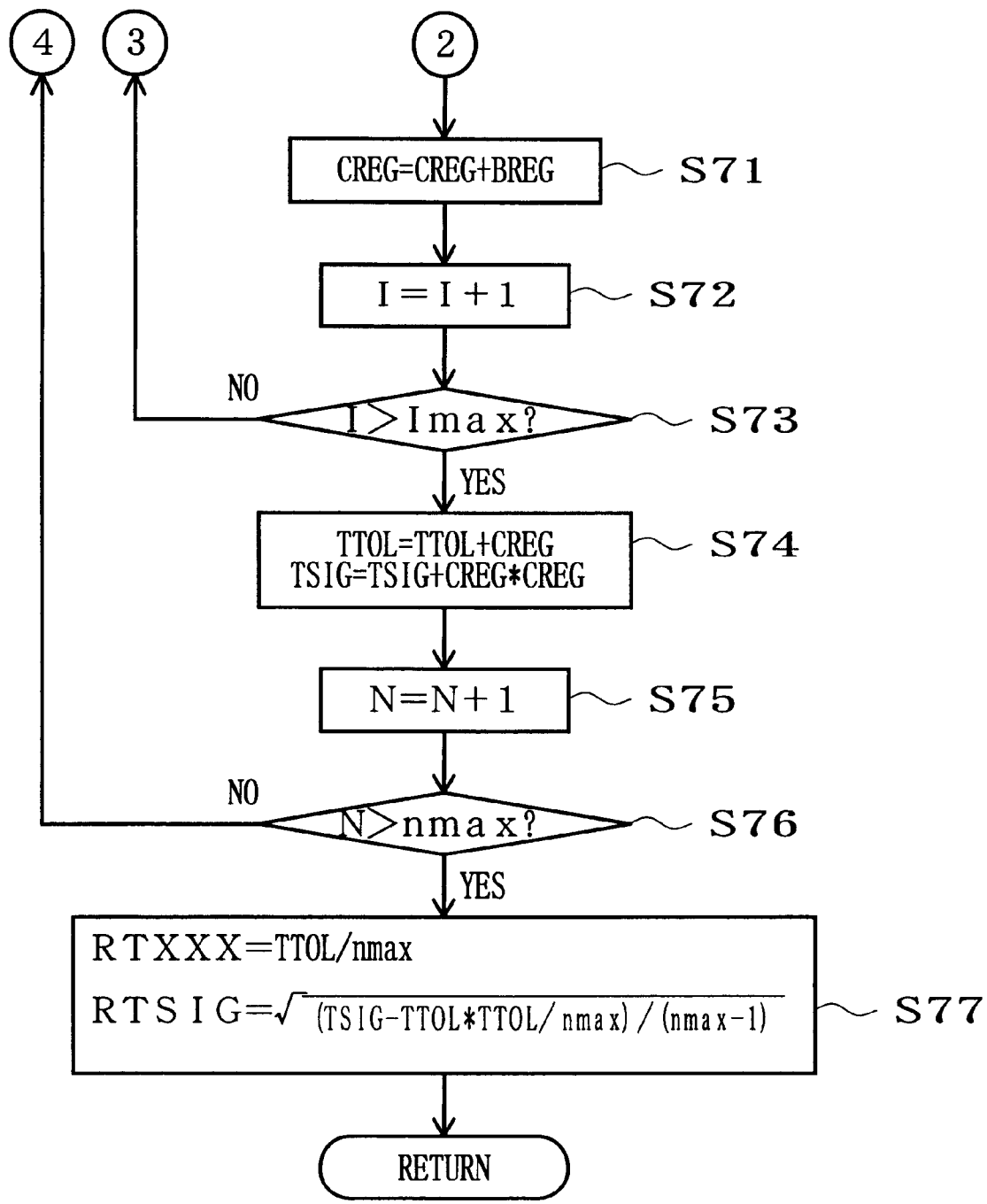

The sensor-data totalizing process uses a main routine shown in FIGS. 5A and 5B and subroutines shown in FIGS. 6 to 9B. The main routine of the sensor-data totalizing process is shown in FIGS. 5A and 5B as divided into two parts for convenience of illustration, but these parts are interconnected via connecting points denoted by circled reference numeral ①. Similarly, FIGS. 9A and 9B show a single subroutine as divided into two parts which are interconnected via connecting points denoted by circled reference numerals ②, ③, and ④

Principal functions of the sensor-data totalizing process are:

(1) calculation of "absolute standard average";
(2) calculation of "pattern standard average";
(3) calculation of "scan position standard average";
(4) calculation of "scan position standard deviation";
(5) calculation of "totalized distance value standard average" and
(6) calculation of "totalized distance value standard deviation"

The term "one sample" as used hereinafter refers to a sample data file relating to a single scan line (i.e., detected data by one of the sensors) on a single bill, and thus one sample data file is comprised of scan position numbers I (I=1, 2, 3, . . . , Imax) for one of the sensors. Here, Imax represents a number on the order of, say, "32". Further, each sample number to identify each sample is represented by "N" which takes any of values 1, 2, 3, . . . , "predetermined maximum value" (hereinafter "nmax"). Here, "nmax" is a relatively great number on the order of, say, "7,000". Also, each sensor data will be represented by NDATA(N, I) which indicates an absolute value of detected data (sensor data) of scan position number I in a sample data file of sample number N.

(1) The "absolute standard average" (ABSX) is a value determined by calculating an "average of absolute values in one sample data file" Dav(N), as indicated by EQUATION 1 below, for each sample number and then averaging the calculated averages as indicated by Equation 2 below. One example of the absolute standard average (ABSX) is shown in FIG. 3B.

$$\frac{\sum_{I=1}^{I\max} NDATA(N, I)}{I\max} = Dav(N) \quad \text{[EQUATION 1]}$$

$$\frac{\sum_{N=1}^{n\max} Dav(N)}{n\max} = ABSX \quad \text{[EQUATION 2]}$$

(2) The "pattern standard average" (PMX) is a value determined by subtracting a "minimum value in one sample data file" MIN from an "absolute value for each individual scan position in the sample data file" NDATA(N, I) to obtain "variation pattern data" Dp(N, I) as indicated by EQUATION 3 below, then obtaining, for each sample number N, an average value Dpav(N) of such "variation pattern data" as indicated by EQUATION 4 below, and subsequently averaging the calculated average values Dpav(N) using EQUATION 5 below. One example of the pattern standard average PMX is shown in FIG. 3B, where a detected level "MIN" represents the above-mentioned minimum value MIN and obliquely hatched regions represent the variation pattern data Dp(N, I). The "variation pattern data" Dp(N, I) in EQUATION 3 is relative value data obtained by expressing the absolute value data NDATA(N, I) in a difference relative to a minimum value MIN within the file.

$$NDATA(N, I) - MIN = Dp(N, I) \quad \text{[EQUATION 3]}$$

(where I=1, 2, . . . , Imax)

$$\frac{\sum_{I=1}^{I\max} Dp(N, I)}{I\max} = Dpav(N) \quad \text{[EQUATION 4]}$$

$$\frac{\sum_{N=1}^{n\max} Dpav(N)}{n\max} = PMX \quad \text{[EQUATION 5]}$$

(3) The "scan position standard average" (HMXADR(I)) is a value determined by using EQUATION 6 below to evaluate, for each sample number N, a "pattern adjustment coefficient" AJS(N) comprising a ratio between the average of the variation pattern data of one sample obtained by EQUATION 4 and the pattern standard average PMX obtained by EQUATION 5, then using EQUATION 7 below to evaluate, for each sample number N and each scan position I, an "adjusted sample data file" CDATA(N, I) by multiplying the variation pattern data of one sample Dp(N, I) obtained by EQUATION 3 by the above-mentioned pattern adjustment coefficient AJS(N) and adding to the multiplication result (product) a difference between the above-mentioned absolute standard average (ABSX) and the pattern standard average (PMX), and subsequently using EQUATION 8 to evaluate an average value of the above-mentioned adjusted sample data file CDATA(N, I) for each scan position I. The "adjusted sample data file" CDATA(N, I) is obtained by normalizing the adjusted sample data expressed in a relative value.

$$\frac{PMX}{Dpav(N)} = AJS(N) \quad \text{[EQUATION 6]}$$

(where N=1, 2, 3, . . . , nmax)

$$\{Dp(N, I)\} * AJS(N) + ABSX - PMX = CDATA(N, I) \quad \text{[EQUATION 7]}$$

$$\frac{\sum_{N=1}^{n\max} CDATA(N, I)}{n\max} = HMXADR(I) \quad \text{[EQUATION 8]}$$

(where I=1, 2, 3, . . . , Imax)
(4) The "scan position standard deviation" (HMSADR(I)) is a standard deviation determined, for each scan position I, by EQUATION 9 using the above-mentioned adjusted sample data file CDATA(N, I) obtained by EQUATION 7.

$$\sqrt{\frac{\sum_{N=1}^{n\max}\{CDATA(N, I)\}^2 - \left(\frac{\left\{\sum_{N=1}^{n\max} CDATA(N, I)\right\}^2}{n\max}\right)}{n\max - 1}} = HMSADR(I) \quad \text{[EQUATION 9]}$$

(where I=1, 2, 3, . . . , Imax)
(5) The "totalized distance value standard average" (RTXXX) is a value determined by using EQUATION 10 below to evaluate a "totalized distance value" TOD(N) for each sample N from the above-mentioned adjusted sample data file CDATA(N, I) obtained by EQUATION 7, scan position standard average HMXADR(I) obtained by EQUATION 8 and scan position standard deviation HMSADR(I) obtained by EQUATION 9, and then using EQUATION 11 below to calculate an arithmetic mean of the totalized distance values.

$$\sum_{I=1}^{I\max} \left\{ \frac{|CDATA(N, I) - HMXADR(I)|}{HMSADR(I)} \right\} = TOD(N) \quad \text{[EQUATION 10]}$$

$$\frac{\sum_{N=1}^{n\max} TOD(N)}{n\max} = RTXXX \quad \text{[EQUATION 11]}$$

(6) The "totalized distance value standard deviation" (RTSIG) is a standard deviation determined by EQUATION 12 below using the totalized distance value TOD(N) obtained by EQUATION 10.

Equation 12

$$\sqrt{\frac{\sum_{N=1}^{n\max}\{TOD(N)\}^2 - \left(\frac{\left\{\sum_{N=1}^{n\max} TOD(N)\right\}^2}{n\max}\right)}{n\max - 1}} = RTSIG \quad \text{[EQUATION 12]}$$

[Detailed Description on Sensor-Data Totalizing Process]

Figure 6:
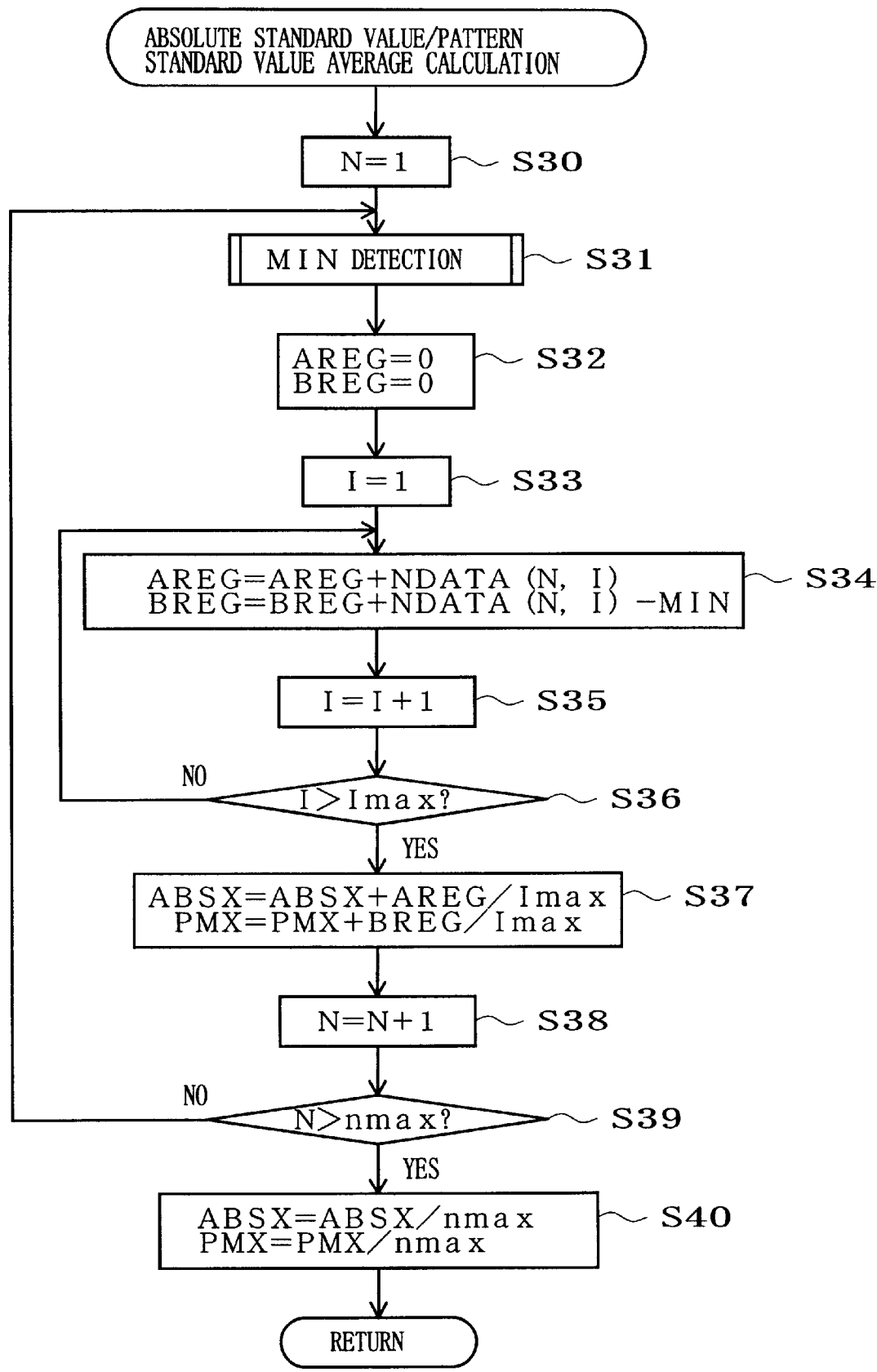
FIG. 6 is a flow chart showing an example of an "absolute standard/pattern standard average calculation" subroutine carried out in the main routine of FIG. 5.

First, at step S10 in FIG. 5A, all registers containing various data arrangements are initialized. At next step S11, an "absolute standard average/pattern standard average calculation" subroutine is carried out as flowcharted in FIG. 6. Specifically, the subroutine of FIG. 6 is intended to calculate the above-mentioned absolute standard average ABSX and pattern standard average PMX. At step S30 of FIG. 6, a register for storing sample number N is set to an initial value "1". At next step S31, a "minimum value (MIN) detection" subroutine is carried out as flowcharted in FIG. 8.

In the minimum value (MIN) detection subroutine of FIG. 8, a register for storing minimum value MIN is initialized to a maximum value "999". Then, the scan position number I is set to an initial value "1" at step S51. At next step S52, a determination is made as to whether or not absolute value NDATA(N, I) of sensor data at scan position (I) in one sample data file (N) specified by N and I is smaller than the current stored value in the minimum value register MIN. If so (YES), the subroutine goes to step S53 in order to store the value NDATA(N, I) into the register MIN for updating of the value MIN. Next, the scan position number I is further incremented by one at step S54, and a determination is made at step S55 as to whether or not the incremented scan position number I is greater than the maximum scan position number Imax. If answered in the negative at step S55, the subroutine loops back to step S52 in order to repeat the operations at and after step S52. This way, absolute value NDATA(N, I) at every scan position I is compared with the current minimum value MIN, so that every last stored value in the register MIN will represent an actual minimum value MIN of the sample data file. In this way, a detection is made of a minimum value MIN of the sensor data in the one sample data file of sample number N.

Referring back to FIG. 6, registers AREG and BREG for temporarily storing data being processed are cleared to "0" at step S32. Specifically, the register AREG is used in calculation of "absolute standard average" ABS while the register BREG is used in calculation of "pattern standard average" PMX. Then, the scan position number I is set to an initial value "1" at step S33. At next step S34, absolute value NDATA(N, I) of sensor data at one scan position I in one sample data file (N) specified by N and I is cumulatively added to the current stored value in the register AREG. Also, a difference between the value NDATA(N, I) and the minimum value MIN detected in the above-mentioned manner is calculated and cumulatively added to the current stored value in the register BREG.

Next, the scan position number I is incremented by one at step S35, and a determination is made at step S36 as to whether or not the incremented scan position number I is greater than the maximum scan position number Imax. If answered in the negative at step S36, the subroutine loops back to step S34 in order to repeat the operations at and after step S34. Thus, the cumulative addition of step S34 is carried out for every scan position number I. When the determination at step S36 becomes affirmative, the sum of the values NDATA(N, I) at all the scan position numbers I for the sample data file N has been stored in the register AREG, and the sum of the differences "NDATA(N, I)–MIN" at all the scan position numbers I for the sample data file N has been stored in the register BREG.

At step S37, each of the sums currently stored in the registers AREG and BREG is divided by the maximum scan position number Imax to evaluate an average of the values or differences. Namely, "AREG/Imax" corresponds to the sample average value Dav(N) obtained by EQUATION 1 above, and "BREG/Imax" corresponds to the variation pattern average value Dpav(N) obtained by EQUATION 4 above. Then, the thus-calculated average values are cumulatively added to the current stored values in the registers ABSX and PMX, respectively, for updating of the contents of the registers ABSX and PMX. Note that the registers ABSX and PMX at an initial stage have been cleared to "0" by the above-mentioned initialization operation.

After that, the sample number N is incremented by one at step S38, and a determination is made at step S39 as to whether or not the incremented sample number N is greater than the maximum sample number nmax. If answered in the negative at step S39, the subroutine loops back to step S31 in order to repeat the operations at steps S31 to S37. Thus, the operations of steps S31 to S37 are carried out for every sample number N. When the determination at step S39 becomes affirmative, the sum of the sample average values Dav(N) (the numerator in the left term of EQUATION 2) for all the sample numbers N has been stored in the register ABSX, and the sum of the variation pattern average values Dpav(N) (the numerator in the left term of EQUATION 5) has been stored in the register PMX. At next step S40, each of the sums currently stored in the registers ABSX and PMX is divided by the maximum sample number nmax to evaluate an average of the values, and the division result is stored into the corresponding register ABSX or PMX. This way, ultimately, the "absolute standard average ABSX" as represented in EQUATION 2 is stored in the register ABSX and the "pattern standard average PMX" as represented in EQUATION 5 is stored in the register PMX.

Upon completion of the subroutine of FIG. 6, the routine reverts to step S12 of FIG. 5A, where the register for storing sample number N is set to an initial value "1". At next step S13, a "variation pattern average calculation" subroutine is carried out as flowcharted in FIG. 7.

First, at step S41 of FIG. 7, the "minimum value (MIN) detection" subroutine is carried out as flowcharted in FIG. 8 so as to detect a minimum value MIN in one sample data file for sample number N. Then, the register AREG is cleared to "0" at step S42, and the scan position number I is set to "1" at step S43.

At next step S44, a difference between the absolute value NDATA(N, I) of sensor data at one scan position I in one sample data file (N) specified by N and I and the minimum value MIN detected in the above-mentioned manner is calculated and cumulatively added to the current stored value in the register AREG. The thus-calculated difference corresponds to the "variation pattern data Dp(N, I)" represented in EQUATION 3 above.

Next, the scan position number I is incremented by one at step S45, and a determination is made at step S46 as to whether or not the incremented scan position number I is greater than the maximum scan position number Imax. If answered in the negative at step S46, the subroutine loops back to step S44 in order to repeat the operations of steps S44 to S46. Thus, the cumulative addition operation of step S44 is carried out for every scan position number I. When the determination at step S46 becomes affirmative, the sum of the differences "NDATA(N, I)–MIN" at all the scan position numbers I for the sample data file N has been stored in the register AREG; this sum corresponds to the numerator in the left term of EQUATION 4. At next step S47, the above-mentioned sum stored in the register AREG is divided by the maximum scan position number Imax to obtain an average of the differences and the stored value in the register AREG is updated with the average. Namely, "AREG/Imax" corresponds to the "variation pattern average value Dpav (N)" obtained by EQUATION 4.

Upon completion of the subroutine of FIG. 7, the routine reverts to step S14 of FIG. 5A, where the pattern standard average PMX is divided by the variation pattern average value Dpav(N) currently stored in the register AREG to obtain the "pattern adjustment coefficient AJS(N)" represented in EQUATION 6 above.

Then, the scan position number I is set to "1" at step S15.

At next step S16, an arithmetic operation of "{NDATA(N, I)–MIN}*AJS+ABSX–PMX" is executed, using the absolute value NDATA(N, I) of sensor data at one scan position I in one sample data file (N) specified by N and I, minimum value MIN in the data file and respective values stored in the registers ABSX, PMX and AJS. The result of the arithmetic operation is stored into the register AREG. This arithmetic operation corresponds to that of EQUATION 7 for one scan position number I; that is, the "adjusted sample data CDATA (N, I)" in EQUATION 7 is evaluated for specific numbers N and I.

At next step S17, the adjusted sample data CDATA(N, I) currently stored in the register AREG is cumulatively added to the current stored value in register TOTAL(I) corresponding to the scan position number I. Also, the adjusted sample data CDATA(N, I) currently stored in the register AREG is squared and the squared result is cumulatively added to the current stored value in register TOLSIG(I) corresponding to the scan position number I. These registers TOTAL(I) and TOLSIG(I) are provided for each scan position number I and are first cleared to "0" by the initialization operation.

Next, the scan position number I is incremented by one at step S18, and a determination is made at step S19 as to whether or not the incremented scan position number I is greater than the maximum scan position number Imax. If answered in the negative at step S19, the routine loops back to step S16 in order to repeat the arithmetic operations of steps S16 and S17. When the arithmetic operations of steps S16 and S17 have been completed for every scan position number I, an affirmative (YES) determination is made at step S19, and the sample number N is incremented by one at next step S20. After that, a determination is made at step S21 as to whether or not the incremented sample number N has become greater than the maximum value nmax. With a negative answer, the routine loops back to step S13 in order to repeat the operations at and after step S13. When the arithmetic operations of steps S13 to S17 have been completed for every sample number N and every scan position number I, an affirmative (YES) determination is made at step S21, so that the routine goes to step S23 by way of connecting points ①. At this stage, the stored content of the register TOTAL(I) for each scan position number I corresponds to a value obtained by summing the adjusted sample data CDATA(N, I), for the position number I, of all the sample numbers (the numerator in the left term of EQUATION 8), and the stored content of the register TOLSIG(I) for each scan position number I corresponds to a value obtained by summing the square of the adjusted sample data CDATA(N, I), for the position number I, of all the sample numbers N.

In FIG. 5B, the scan position number I is set to "1" at step S23, and predetermined arithmetic operations are executed at step S24. Then, the scan position number I is incremented by one at step S25, and a determination is made at step S26 as to whether or not the incremented scan position number I is greater than the maximum scan position number Imax. If answered in the negative at step S26, the routine loops back to step S24 in order to repeat the predetermined arithmetic operations.

The first arithmetic operation executed at step S24, HMXADR(I)=TOTAL(I)/nmax, is for dividing the stored content of the register TOTAL(I) by the total number of the samples (maximum sample number) nmax to obtain the "scan position standard average HMXADR(I)" as represented in EQUATION 8.

The second arithmetic operation executed at step S24, TEMP=TOTAL(I)*TOTAL(I), is for squaring the stored content of the register TOTAL(I) for each scan position number I and storing the square into a temporary register TEMP.

The last arithmetic operation executed at step S24 comprises obtaining the "scan position standard deviation HMSADR(I)" as represented in EQUATION 9. Namely, here, a value obtained by dividing the square of the sum of adjusted sample data CDATA(N, I) currently stored in the register TEMP by the number nmax is subtracted from the square of the sum of adjusted sample data CDATA(N, I) currently stored in the register TOLSIG(I), and the root of the subtraction result is evaluated.

Once the scan position standard average HMXADR(I) and scan position standard deviation HMSADR(I) have been calculated for every scan position I in the above-mentioned manner, an affirmative determination is made at step S26, so that a "distance value totalization" subroutine is carried out at step S27 as flowcharted in FIGS. 9A and 9B.

In FIG. 9A, registers TTOL and TSIG for arithmetic operation purposes are cleared to "0" at step S60, and the sample number N is set to "1" at step S61.

Then, at step S62, the "variation pattern average calculation" subroutine is carried out as flowcharted in FIG. 7, and the "variation pattern average value Dpav(N)" as represented in EQUATION 4 is stored into the register AREG.

At next step S63, the pattern standard average PMX is divided by the variation pattern average value Dpav(N) currently stored in the register AREG to obtain and store the "pattern adjustment coefficient AJS(N)" as represented in EQUATION 6 above, similarly to step S14 of FIG. 5A.

Next, register CREG is cleared to "0" at step S64, and the scan position number I is set to "1" at step S65.

At next step S66 is executed an arithmetic operation similar to that of step S16 of FIG. 5A. Namely, the "adjusted sample data CDATA(N, I)" as represented in EQUATION 7 is evaluated for specific numbers N and I and stored into the register AREG.

At next step S67, a determination is made as to whether or not the adjusted sample data CDATA(N, I) currently stored in the register AREG is greater than the scan position standard average HMXADR(I). If answered in the affirmative at step S67, the subroutine goes to step S68 to evaluate a difference "AREG−HMXADR(I)" for storage into the register BREG; otherwise, the subroutine branches to step S69 to evaluate a difference "HMXADR(I)−AREG" for storage into the register BREG. In this way, an absolute value of the difference "CDATA(N, I)−HMXADR(I)" as represented in EQUATION 10 is obtained and stored into the register BREG.

At step S70, the current stored value in the register BREG is divided by the scan position standard deviation HMSADR (I), and the division result is stored into the register BREG.

This way, how far the adjusted sample data CDATA(N, I) for the scan number I differs or deviates from the scan position standard average HMXADR(I) in terms of a multiple of the position standard deviation HMSADR(I)is represented by a specific normalized or standardized numerical value, which is temporarily stored into the register BREG. Such a normalized or standardized numerical value is called a "standardization variable" in the field of statistics, which, however, is herein referred to as a "distance value" for convenience of description; thus, the distance value of the adjusted sample data CDATA(N, I) for each scan number I will be hereinafter called a "scan position distance value" SPD(N, I). As may be apparent, the "scan position distance value" is represented by EQUATION 13 below.

$$\frac{|CDATA(N, I) - HMXADR(I)|}{HMSADR(I)} = SPD(N, I) \qquad \text{[EQUATION 13]}$$

At next step S71 of FIG. 9B, the current stored value in the register BREG is cumulatively added to the content of the register CREG. Then, the scan position number I is incremented by one at step S72, and a determination is made at step S73 as to whether or not the incremented scan position number I is greater than the maximum scan position number Imax. If answered in the negative at step S66 (FIG. 9A), the subroutine loops back to step S66 in order to repeat the operations at and after step S66. When the arithmetic operations of steps S66 to S70 have been completed for every scan position number I, an affirmative determination is made at step S73. At this time, the register CREG indicates the "totalized distance value" TOD(N) as represented in EQUATION 10 for a given sample N. Namely, the "totalized distance value" TOD(N) is an arithmetic sum of the scan position distance value represented in EQUATION 13 above.

At following step S74, the current stored content of the register CREG is cumulatively added to that (0 at an initial stage) of the totalizing register TTOL. Also, the above-mentioned totalized distance value TOD(N) stored in the register CREG is squared and then cumulatively added to the current stored content (0 at an initial stage) of the register TSIG.

Then, the sample number N is incremented by one at next step S75. After that, a determination is made at step S76 as to whether or not the incremented sample number N has become greater than the maximum value nmax. With a negative answer, the subroutine loops back to step S62 of FIG. 9A in order to repeat the operations at and after step S62. When the arithmetic operations of steps S62 to S74 have been completed for every sample number N and every scan position number I, an affirmative (YES) determination is made at step S76, so that the routine goes to step S77.

The first arithmetic operation executed at step S77, RTXXX=TTOL/nmax, is for dividing the stored content of the register TTOL by the total number of the samples (maximum sample number) nmax to obtain the "totalized distance value standard average RTXXX" as represented in EQUATION 11.

The second arithmetic operation executed at step S77 is for evaluating the "totalized distance value standard deviation RTSIG" as represented in EQUATION 12. Namely, here, a value obtained by dividing the square of the totalized distance value TOD(N) currently stored in the register TTOL by the number nmax is subtracted from the square of the sum of the totalized distance value TOD(N) currently stored in the register TSIG, and the root of the subtraction result is evaluated.

When the totalized distance value standard average RTXXX and totalized distance value standard deviation RTSIG have been calculated in the above-mentioned manner, the distance value totalization subroutine of FIGS. 9A and 9B comes to an end.

[Outline of Standard Data Tables

Through the above-described sensor-data totalizing process, there are provided:

(1) "absolute standard average ABSX";
(2) "pattern standard average PMX";
(3) "scan position standard average HMXADR(I)";
(4) "scan position standard deviation HMSADR(I)";
(5) "totalized distance value standard average RTXXX"; and
(6) "totalized distance value standard deviation RTSIG",
in correspondence with a single combination of any one of the denominations, any one of the bill insertion directions and any one of the sensors P0–P4. The six data at items (1) to (6) above are then stored, as a set of bill-identification standard data, into a table with the information on the denomination, bill insertion direction and sensor as an index (see step S3 of FIG. 4).

Thus, sets of the six different data at items (1) to (6) above are determined in correspondence with all possible combinations of the denominations, bill insertion directions and sensors P0–P4 and stored into the tables. If the denomination is represented by "KIN", the bill insertion direction by "INS" and the sensor by "SEN" as one example way of indexing, the six different data corresponding to all the possible combinations may be represented as follows:

absolute standard average: ABSX(KIN, INS, SEN);
pattern standard average: PMX(KIN, INS, SEN);
scan position standard average: HMXADR(KIN, INS, SEN, I);
scan position standard deviation: HMSADR(KIN, INS, SEN, I);
totalized distance value standard average: RTXXX(KIN, INS, SEN); and
totalized distance value standard deviation: RTSIG(KIN, INS, SEN)

As a modification, the totalized distance value standard average RTXXX(KIN, INS, SEN) and the totalized distance value standard deviation RTSIG(KIN, INS, SEN) for each of the sensors may be summed so that they can be indexed with KIN and INS alone as follows:

totalized distance value standard average: RTXXX(KIN, INS); and
totalized distance value standard deviation: RTSIG(KIN, INS)

At step S3 of FIG. 4, the following determination parameters are set, as additional bill identification standard data and tabled.

(7) Scan Position Determination Magnification (PMST)

This is intended to set a limitary determination value of the distance value for each of the scan positions I (namely, the "scan position distance value" SPD(N, I) as represented in EQUATION 13 above), and indicates a certain magnification n (n is an arbitrary number containing a decimal portion) relative to the scan position standard deviation HMSADR(I) as seen from EQUATION 13 above. The scan position determination magnification PMST is determined empirically by simulation where a multiplicity of authentic bills of a given denomination are inserted into the bill identifying device and it is determined whether the scan position distance values SPD(N, I) acquired in response to the insertion of the bills show acceptability of the bills as authentic in the light of variously set limitary determination values n (i.e., simulation for identifying an authentic-bill acceptance rate). A single value indicative of an optimum magnification n capable of achieving a desired acceptability rate can be set as the scan position determination magnification PMST by executing the simulation in such a condition where the limitary determination values for the individual scan position distance values are set to various values within a range of magnifications n "4.0" to "6.0" relative to the scan position standard deviation HMSADR(I) using a minimum magnification unit of "0.2". Such a scan position determination magnification PMST is determined in relation to each of the denominations and each of the bill insertion directions and stored in a table format with KIN and INS as indices as follows; that is, Scan Position Determination Magnification: PMST(KIN, INS)

Note that because the scan position determination magnification is intended to set a limitary determination value for the scan position distance value SPD(N, I), it may be more proper to use another term such as "determination standard value for scan position distance value", but the term "scan position determination magnification" will be used as before.

(8) Approximate Denomination Table (KINJI)

The approximate denomination table indicates whether there are any denominations approximate to or closely resembling each other in pattern. Through simulation using a multiplicity of bills, a detection is made of whether there are any denominations that are approximate to each other in pattern. If there are any such approximate denominations, data on these approximate patterns are stored in the table. Presence or absence of approximate denominations is determined in relation to each of the denominations and each of the bill insertion directions, and data on the approximate denominations are stored in such a table format using "KIN" and "INS" as indices, as will be set forth below.

Approximate Denomination Table: KINJI(KIN, INS)

The data stored in the approximate denomination table comprise codes indicative of the approximate denominations and codes indicative of inserted directions of the associated bills. For example, when a detected pattern of a given bill in a given bill insertion direction is approximate to a detected pattern of another bill in another bill insertion direction, the denomination codes and insertion direction codes are stored at indexed locations in the table. In the absence of approximate denominations, code "0" is stored. The approximate denomination table is not necessarily essential to the present invention, but it may prove useful for adjustment of identifying sensitivity and hence increased accuracy when approximate denominations are inserted into the device.

(9) Totalized Distance Value Determination Magnification (TMST)

This is intended to set a limitary determination value of the totalized distance value and indicates a value evaluated by adding the totalized distance value standard average RTXXX to a product resulting from multiplication of the totalized distance value standard deviation RTSIG by m (m is an arbitrary number containing a decimal portion). This totalized distance value determination magnification TMST is also determined empirically by simulation where a multiplicity of authentic bills of a given denomination are inserted into the device and an authentic-bill acceptance rate is determined using various multiples (namely, multipliers) m. A single value indicative of an optimum magnification n capable of achieving a desired acceptability rate can be set as an optimum multiple m relative to the totalized distance value standard deviation RTSIG, by executing the simulation in such a condition where the limitary determination values for the totalized distance values are set to various values within a range of magnifications m "3.0" to "5.0" relative to the totalized distance value standard deviation RTSIG using a minimum magnification unit of "0.2". The totalized distance value determination magnification TMST is provided as a value evaluated by adding the totalized distance value standard average RTXXX to a product resulting from multiplication of the totalized distance value standard deviation RTSIG by the thus-determined magnification m. Such a totalized distance value determination magnification TMST is determined in relation to each of the denominations and each of the bill insertion directions and stored in a table format with KIN and INS as indices as follows; that is, Totalized Distance Value Determination Magnification: TMST(KIN, INS)

Because the totalized distance value determination magnification is intended to set a limitary determination value for the totalized distance value TOD(N), it may be more proper to use another term such as "determination standard value for totalized distance value", but the term "totalized distance value determination magnification" will be used as before.

(10) Approximate Denomination Processing Flag (FKINJI)

This is a flag for setting a specific mode in which a given bill is to be treated when the bill has been judged, through the bill identifying operations, to be authentic with regard to two or more denominations. To permit optimum processing, the approximate denomination processing flag is provided in relation to each of the denominations and each of the bill insertion direction, and stored in a table format with KIN and INS as indices. Namely, here, the approximate denomination processing flag is represented as FKINJ(KIN, INS). The approximate denomination processing flag is set to "0" when the bill is to be returned and set to "1" when the bill is to be treated as authentic with respect to one of the denominations for which the inserted bill presents a smaller totalized distance value.

Some of the standard dada are preferably stored in a rewritable ROM, to allow the user of the bill validating device of the present invention to modify or adjust the data as necessary. For instance, tables for some of the standard data, such as a "scan position determination magnification" table PMST(KIN, INS) and "totalized distance value determination magnification" table TMST(KIN, INS), relating to the adjustment of validating sensitivity as well as the "approximate denomination processing flag table" may be included in the rewritable ROM so that they can be rewritten as necessary. It should be obvious that these standard data may be set such as by manual data setting switches, rather than being stored in a table format.

[Detailed Description on Bill Identifying Process]

Now, a specific example of the bill identifying or process in accordance with the present invention will hereinafter be described in detail with reference to FIGS. 10 to 13.

Figure 10:
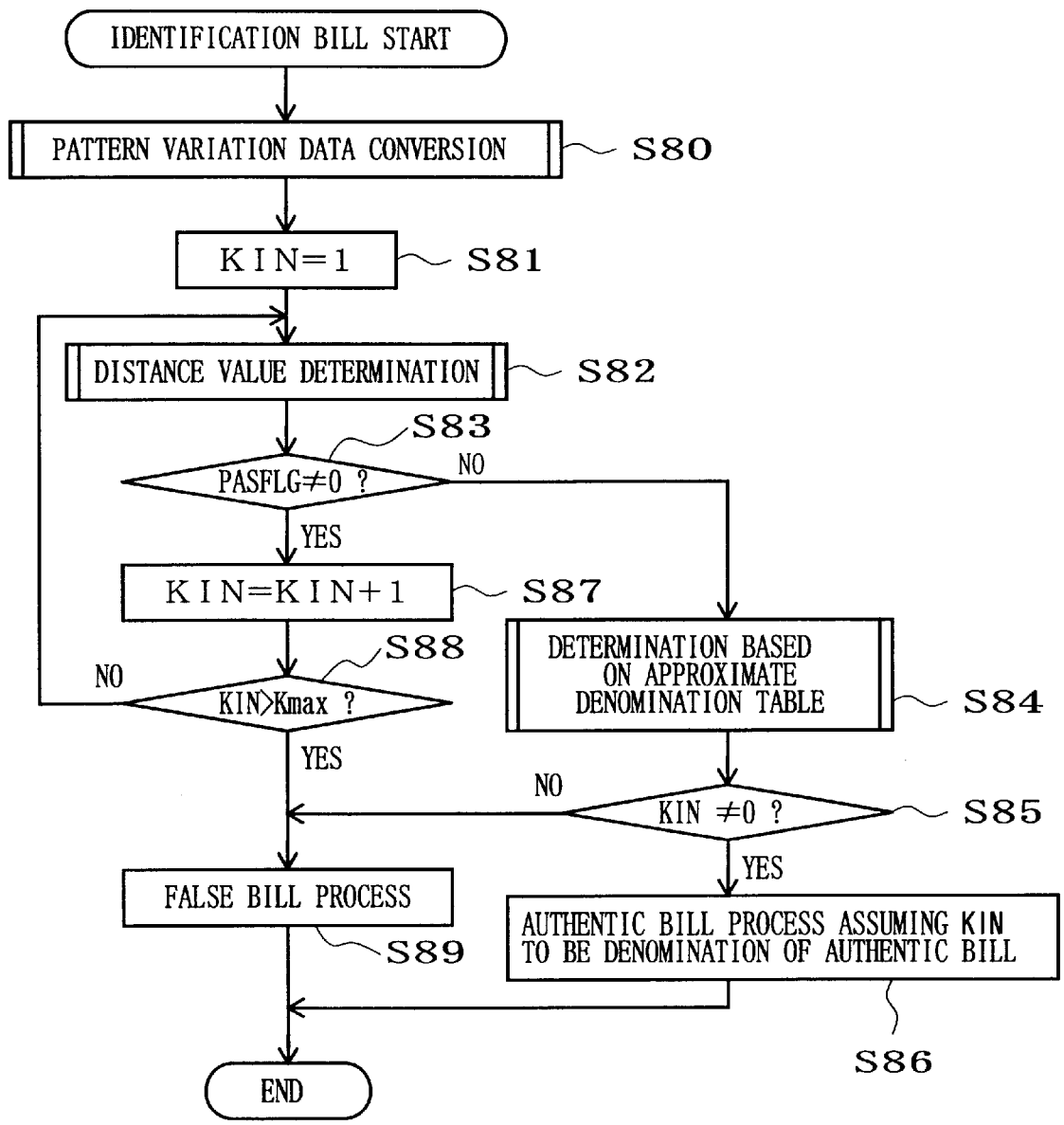
FIG. 10 is a flow chart showing an example of a main routine of a "bill identifying process" in accordance with the embodiment of the present invention.

FIG. 10 is a flow chart of a main routine of the bill identifying process, which is triggered when a bill to be identified or validated is inserted into the bill identifying device and data files acquired through the sensors P0 to P4 are stored into a predetermined buffer register BUF(SEN, I). The index SEN of the buffer register BUF(SEN, I) indicates one of the sensor P0–P4 and the index I indicates one of the scan positions I. For simplicity, the following description will be made about the bill identifying process based on detected data by only one of the sensors P0–P4, and thus the buffer register BUF for storing the detected data will be represented as BUF(I) without the sensor-identifying index SEN. For the same reason, various standard data tables for use in the bill identification will also be represented without the sensor-identifying index SEN, although they are used in corresponding relations to the sensors. For example, whereas the "pattern standard average" PMX should normally be represented as PMX(KIN, INS, SEN), it will be represented as PMX(KIN) for simplicity of description. The same simplification will apply to the other data.

Figure 11:
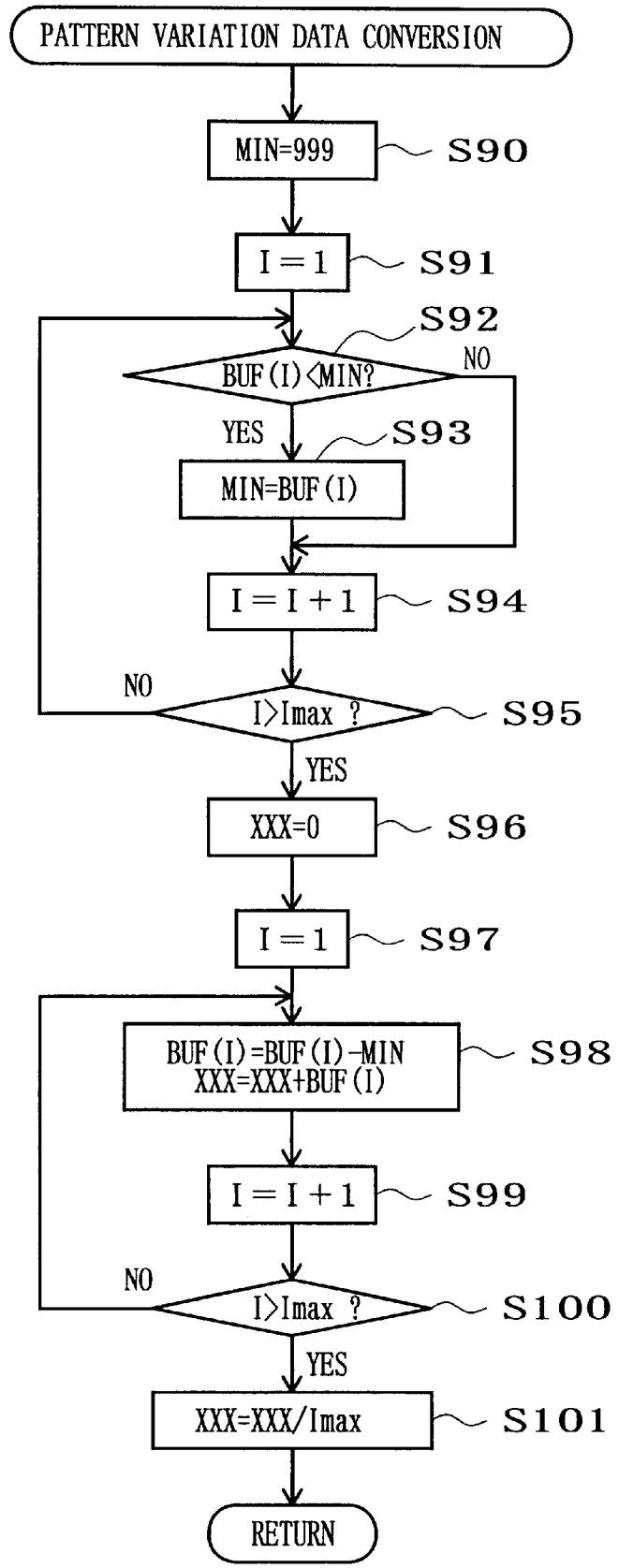
FIG. 11 is a flow chart showing an example of a "pattern variation data conversion" subroutine carried out in the bill identifying process of FIG. 10.

At first step S80 in FIG. 10, a "pattern variation data conversion" subroutine is carried out as flowcharted in FIG. 11.

(1) Calculation of Variation Pattern Data and Variation Pattern Average

In the pattern variation data conversion subroutine of FIG. 11, a detection is made of a minimum value MIN in the sensor file data stored in the buffer register BUF(I) (I=1, 2, 3, . . . , Imax), through operations of steps S90 to S95 similar to those of steps S50 to S55 in the subroutine of FIG. 8.

Namely, the register for storing minimum value MIN is initialized to a maximum value "999" at step S90. Then, the scan position number I is set to an initial value "1" at step S91. At next step S92, a determination is made as to whether or not an absolute value of sensor data at scan position (I) currently stored in the buffer register BUF specified by scan position number I is smaller than the current stored value in the minimum value register MIN. If so (YES), the subroutine goes to step S93 in order to store the absolute value into the register MIN for updating of the value MIN. Next, the scan position number I is incremented by one at step S94, and a determination is made at step S95 as to whether or not the incremented scan position number I is greater than the maximum scan position number Imax. If answered in the negative at step S95, the subroutine loops back to step S92 in order to repeat the operations at and after step S92. This way, the value stored in the buffer register BUF(I) at every scan position I is compared with the current minimum value MIN, so that every last stored value in the register MIN will represent an actual minimum value MIN.

Then, through operations of steps S96 to S101, similar to those of steps S42 to S47 in the subroutine of FIG. 7, "variation pattern data" (corresponding to Dp(I) in EQUATION 3 above) on the inserted bill is calculated and stored in the register BUF(I), and also a "variation pattern average value" (corresponding to "Dpav" in EQUATION 4 above) is calculated and stored into the register XXX.

Namely, the register XXX is cleared to "0" at step S96, and the scan position number I is set to "1" at step S97. At next step S98, a difference between the absolute value of sensor data at one scan position I in one sample data file (N) specified by I and the minimum value MIN detected in the above-mentioned manner is calculated and the content of the buffer register BUF(I) is updated with the thus-calculated difference. The calculated difference corresponds to the "variation pattern data Dp(I)" in EQUATION 3 above. Also, the updated content of the buffer register BUF(I) is cumulatively added to the current value stored in the register XXX at step S98.

Next, the scan position number I is incremented by one at step S99, and a determination is made at step S100 as to whether or not the incremented scan position number I is greater than the maximum scan position number Imax. If answered in the negative at step S100, the subroutine loops back to step S98 in order to repeat the operations of steps S98 and S99. When the determination at step S100 becomes affirmative, the sum of the variation pattern data Dp(I) at all the scan position numbers I for the sensor data file of the inserted file has been stored in the register XXX. At next step S101, the above-mentioned sum stored in the register XXX is divided by the maximum scan position number Imax to obtain an average of the variation pattern data and the stored value in the register XXX is updated with the average. Namely, "XXX/Imax" corresponds to the "variation pattern average value Dpav" in EQUATION 4 above.

Through these operations, the variation pattern data, corresponding to the variation pattern data Dp(I) in EQUATION 3, on the inserted bill is stored in the buffer register BUF(I), and the variation pattern average value Dpav obtained from the variation pattern data is stored into the register XXX.

(2) Calculation of Pattern Adjustment Coefficient

Referring back to FIG. 10, upon completion of the subroutine of step S80, a register KIN for storing a value indicative of a denomination and bill insertion direction to be processed is set to an initial value "1" at step S81. In the case where bills of three denominations can be inserted in four bill insertion directions, the value of the register KIN will vary within a range from "1" to "12". The maximum value of the register KIN will be represented by Kmax. After step S81, a "distance value determination" subroutine is carried out at step S82 as flowcharted in FIG. 12. The distance value determination subroutine determines distance values at the individual scan positions on the inserted bill and a totalized distance value.

Figure 12:
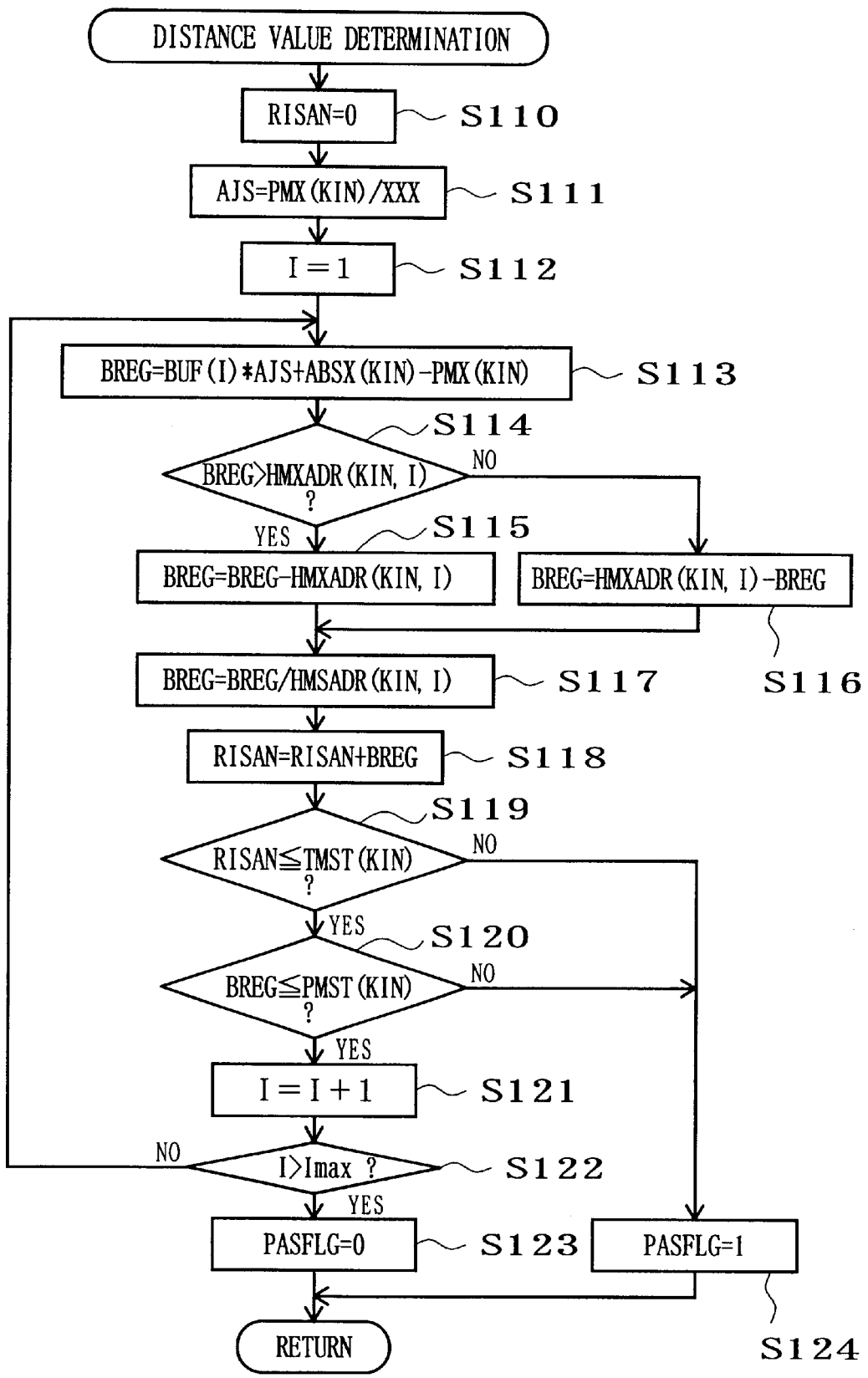
FIG. 12 is a flow chart showing an example of a "distance value determination" subroutine carried out in the bill identifying process of FIG. 10.

In FIG. 12, a totalized distance value register RISAN is first cleared to "0" at step S110. At next step S111, an arithmetic operation similar to EQUATION 6 is carried out to evaluate a "pattern adjustment coefficient" AJS for the inserted bill. Namely, a "pattern standard average PMX" for the denomination and bill insertion direction specified by the register KIN, which is represented below by PMX(KIN) for convenience sake although actually it should be represented by PMX(KIN, INS, SEN), is retrieved from one of the standard data tables and divided by the variation pattern average value Dpav currently stored in the register XXX, and the resultant quotient is stored into the register AJS as a "pattern adjustment coefficient" AJS for the inserted bill.

(3) Calculation of Scan Position Distance Value and Totalized Distance Value

Next, the scan position number I is set to "1" at step S112, and an arithmetic operation similar to that of step S16 of FIG. 5A is carried out. Namely, adjusted sample data, corresponding to the "adjusted sample data CDATA(N, I)" in EQUATION 7 above, on the inserted bill is calculated for the specific scan position number I and stored into the register BREG. More specifically, an "absolute standard average ABSX" for the denomination and bill insertion direction specified by the register KIN, which is represented below by ABSX(KIN) for convenience sake although actually it should be represented by ABSX(KIN, INS, SEN), is retrieved from one of the standard data tables, and the pattern standard average PMX(KIN) is retrieved from the standard data table. Then, using the thus-retrieved absolute standard average ABSX(KIN) and pattern standard average PMX(KIN) and the pattern adjustment coefficient AJS for the inserted bill currently stored in the register AJS, an arithmetic operation of "BUF(I)*AJS+ABSX(KIN)−PMX(KIN)" is executed with respect to the variation pattern data (corresponding to Dp(I) in EQUATION 3) for the bill currently stored in the buffer register BUF(I), and the result of the arithmetic operation is stored into the register BREG. This arithmetic operation corresponds to that of EQUATION 7 for one scan position number. As in the foregoing example, the part "+ABSX(KIN)−PMX(KIN)" may be omitted as necessary, leaving only the part "BUF(I)*AJS".

At next step S114, a "scan position standard average HMXADR(I)" for the denomination and bill insertion direction specified by the register KIN, which is represented below by HMXADR(KIN, I) for convenience sake although actually it should be represented by HMXADR(KIN, INS, SEN, I), is retrieved from one of the standard data tables, and a determination is made as to whether or not the current stored value in the register BREG is greater than the retrieved scan position standard average HMXADR(KIN, I). If answered in the affirmative, the subroutine proceeds to step S115, where an arithmetic operation of "BREG−HMXADR(KIN, I)" is executed and the executed result is stored into the register BREG. With a negative answer, however, the subroutine branches to step S116, where an arithmetic operation of "HMXADR(KIN, I)−BREG" is executed and the executed result is stored into the register BREG. In this way, the absolute value of the difference between BREG and HMXADR(KIN, I) is stored into the register BREG.

At next step S117, a "scan position standard deviation HMSADR(I)" for the denomination and bill insertion direction specified by the register KIN, which is represented below by HMSADR(KIN, I) for convenience sake although actually it should be represented by HMSADR(KIN, INS, SEN, I), is retrieved from one of the standard data tables, and then the current stored value in the register BREG is divided by the thus-retrieved scan position standard deviation HMSADR(KIN, I), so that the division result is stored into the register BREG. In this way, a distance value is determined from the scan position standard deviation HMSADR (KIN, I) of sensor data at the scan position I for the inserted bill and then stored into the register BREG.

At next step S118, the scan position distance value SPD(I) currently stored in the register BREG is cumulatively added to the content of the totalized distance value register RISAN. Thus, the totalized distance value TOD is calculated and stored into the register RISAN when the cumulative addition at step S118 has been completed for every scan position number I.

At next step S119, a "totalized distance value determination magnification TMST" for the denomination and bill insertion direction specified by the register KIN, which is represented below by TMST(KIN) for convenience sake although actually it should be represented by TMST(KIN, INS), is retrieved from one of the standard data tables, and then a determination is made as to whether the thus-retrieved totalized distance value determination magnification TMST (KIN) is equivalent to or greater than the stored value in the register RISAN (RISAN≦TMST(KIN)). If answered in the affirmative, this means that the totalized distance value of the inserted bill falls within an allowable range, and the subroutine goes to step S120. If, however, answered in the negative, this means that the totalized distance value of the inserted bill falls outside the allowable range, and the subroutine goes to step S124. Thus, at this step, it is ascertained whether the totalized distance value of the inserted bill is within an appropriate range in the light of the totalized distance value determination standard value, i.e., totalized distance value determination magnification TMST (KIN). If an affirmative determination is made at step S119 for every scan position number I, this means that the totalized distance value of the inserted bill is within the appropriate range in the light of the totalized distance value determination standard value, i.e., totalized distance value determination magnification. TMST(KIN).

At next step S120, a "scan position determination magnification PMST" for the denomination and bill insertion direction specified by the register KIN, which is represented below by PMST(KIN) for convenience sake although actually it should be represented by PMST(KIN, INS), is retrieved from one of the standard data tables, and then a determination is made as to whether the thus-retrieved scan position determination magnification PMST(KIN) is equivalent to or greater than the stored value in the register BREG (BREG≦PMST(KIN)). If answered in the affirmative, this means that the scan position distance value of the inserted bill is within an allowable range, and the subroutine goes to step S121. If, however, answered in the negative, this means that the scan position distance value of the inserted bill falls outside the allowable range, and the subroutine goes to step S124. Thus, at this step, it is ascertained whether the scan position distance value of the inserted bill is within an appropriate range in the light of the scan position distance value determination standard value, i.e., scan position determination magnification PMST(KIN).

Next, the scan position number I is incremented by one at step S121, and a determination is made at step S122 as to whether or not the incremented scan position number I is greater than the maximum scan position number Imax. If answered in the negative at step S122, the subroutine loops back to step S113 in order to repeat the arithmetic operations of steps S113 to S120. When the arithmetic operations of steps S113 to S120 have been executed for every scan position number I and if the scan position distance value of the inserted bill has been judged to be within the appropriate range, an affirmative determination is made at step S122, so that a determination flag PASFLG is set to "0" at step S123. If, on the other hand, a negative determination is made at any one of steps S119 and S120, the subroutine branches to step S124 to set the determination flag PASFLG to "1".

When set at value "0", the determination flag PASFLG indicates that the inserted bill has been determined to be authentic with respect to the denomination KIN being currently considered, while when set at value "1", the determination flag PASFLG indicates that the inserted bill has been not determined to be authentic with respect to the denomination KIN being currently considered.

Whereas both the totalized distance value and the scan position distance value are determined at steps S119 and S120 in the preferred embodiment, either one of the totalized distance value and the scan position distance value may be determined. Further, in the illustrated example, the determination flag PASFLG is set to "1" at step S124 as long as a negative determination is made at step S120 at least once (for at least one scan position); however, the invention is not so limited, and the determination flag PASFLG may be set to "1" only when the negative determination has resulted at step S120 over a predetermined number of times.

It is assumed here that the inserted bill is ultimately determined to be an authentic bill only when the detected data by all the sensors P0 to P4 show the authenticity of the bill, although the arithmetic operations for only one of sensors P0–P4 for convenience of illustration. More specifically, it is assumed here that the operations of steps S113 to S122 are performed on detected data by all the sensors P0 to P4 so that ultimately the totalized distance values relating to all the sensors P0 to P4 are totalized in the totalized distance value register RISAN and the scan position distance values relating to all the sensors P0 to P4 are totalized in the register BREG, and that steps S119 and S120 make a comparison between the contents of the registers RISAN and BREG storing the total values relating to all the sensors P0 to P4 and the predetermined standard data TMST(KIN), PMST(KIN).

(4) Reference to Approximate Denomination Table

Referring back to FIG. 10, it is determined at step S83 whether or not the value of the determination flag PASFLG set as a result of the determination of step S82 is other than "0". If answered in the affirmative, this means that the inserted bill has not been determined to be an authentic bill and it is necessary to make similar determinations for other denominations and bill insertion directions. Thus, the stored value in the register KIN is incremented by one at step S87, and a determination is made at step S88 as to whether or not the incremented value KIN is greater than a predetermined maximum value Kmax. If answered in the negative at step S88, the subroutine loops back to step S82 in order to repeat the above-mentioned determination for the incremented value KIN. When the inserted bill has been determined to be non-authentic or false with respect to all the denominations and bill insertion directions, the subroutine goes to step S89 to ultimately determine the inserted bill to be false and carry out other necessary operations such as for returning the bill.

When, on the other hand, the inserted bill has been ultimately determined to be authentic with respect to any one of the denominations through the determination of step S82, a negative determination is made at step S83 now that the determination flag PASFLG has been set to "0". Thus, the subroutine branches to step S84 in order to carry out an "determination based on approximate denomination table" subroutine as flowcharted in FIG. 13.

Figure 13:
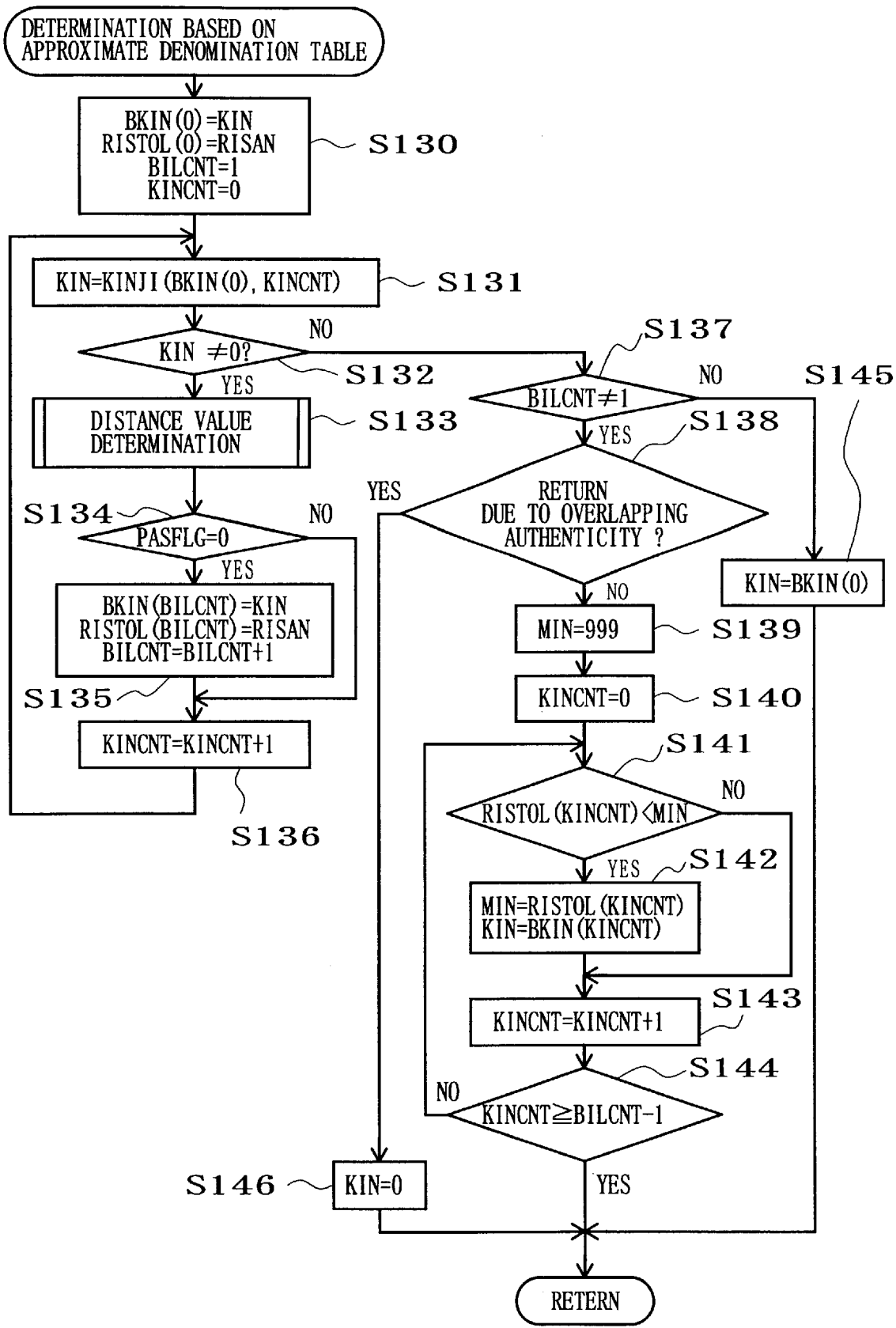
FIG. 13 is a flow chart showing an example of a "validation based on approximate denomination table" subroutine carried out in the bill identifying process of FIG. 10.

In the determination based on approximate denomination table of FIG. 13, the authenticity of the inserted bill is further determined with respect to any other denomination, for which the bill is likely to be determined to be authentic, by reference to the approximate denomination table KINJI (KIN, INS), in order to identify only one actual denomination of the inserted bill. In case one actual denomination can not be identified by the above-mentioned operations, the inserted bill will be returned as false.

At first step S130 in the subroutine of FIG. 13, the following operations are carried out.

The current stored value in the register KIN, indicative of a specific denomination for which the inserted bill has been first determined to be authentic through the operation of step S82, is reserved in a register BKIN(0). Also, the total distance value of the inserted bill stored in the totalized distance value register RISAN, relating to a specific denomination for which the inserted bill has been first determined to be authentic, is reserved in a register RISTOL(0). Authentic bill determination counter BILCNT is then set to "1", and a pointer KINCNT for reading the approximate denomination table is set to "0".

At next step S131, an approximate denomination code is read out from the above-mentioned approximate denomination table using the values of the register BKIN(0) and pointer KINCNT as read addresses, and the read-out data is stored into the register KIN.

At step S132, a determination is made as to whether the read-out approximate denomination code KIN is not "0" (i.e., whether there are no approximate denominations). If answered in the negative at step S132, this means that there is no other denomination approximate to that denomination with respect to which the inserted bill has been first determined to be authentic through the operation of step S82, so that the subroutine branches to step S137. If, on the other hand, answered in the affirmative at step S132, this means that there is another denomination approximate to the denomination with respect to which the inserted bill has been first determined to be authentic through the operation of step S82, so that the subroutine branches to step S133.

The following paragraphs describe a situation where there is another denomination approximate in pattern to the specific denomination with respect to which the inserted bill has been first determined to be authentic through the operation of step S82. At step S133 is carried out the distance value determination subroutine of FIG. 12. Now that the current stored value in the register KIN indicates a code of another denomination approximate in pattern to the specific (i.e., first-authenticity-identified) denomination, the distance value determination subroutine of FIG. 12 is executed using various standard data on the other denomination, so as to validate the inserted bill with respect to the other denomination.

At step S134, it is ascertained whether or not the determination flag PASFLG is at "0". When the inserted bill has been determined to be also authentic with the other denomination, the flag PASFLG is at "0", so that the subroutine carries out the following operations at next step S135.

·BKIN(BILCNT)=KIN:

The current stored value in the register KIN (indicating the other denomination approximate to the specific, i.e., first-authenticity-identified, denomination) is set into a register BKIN(BILCNT) specified by the current stored value in the authentic bill determination counter BILCNT.

·RISTOL(BILCNT)=RISAN:

The totalized distance value currently stored in the register RISAN is set into a register RISTOL(BILCNT) specified by the current stored value in the authentic bill determination counter BILCNT.

·BILCNT=BILCNT+1:

The value of the authentic bill determination counter BILCNT is incremented by one.

After that, the subroutine proceeds to step S136 in order to increment the pointer KINCNT for reading the approximate denomination table (KINCNT=KINCNT+1). When the inserted bill has been determined to be non-authentic or false with the other denomination, the flag PASFLG is set at "1", so that a negative determination is made at step S134 and the subroutine jumps over step S135 to step S136.

After step S136, the subroutine loops back to step S131 in order to read out stored data from a next address of the approximate denomination table KINJI. If a code indicative of still another denomination approximate to the first-authenticity-identified denomination, an affirmative determination is made at step S132 and then the operations of steps S133 to S136 are repeated. If no code indicative of still another denomination approximate to the first-authenticity-identified denomination is stored in the approximate denomination table KINJI, a value "0" is read out from the table KINJI.

If answered in the negative at step S132, the subroutine branches to step S137 in order to ascertain whether the value currently set in the authentic bill determination counter BILCNT is other than "1".

If no code indicative of another denomination approximate in pattern to the specific or first-authenticity-identified denomination is stored in the approximate denomination table at all, or when the inserted bill has been determined to be non-authentic with the other denomination, a negative determination is made at step S137 now that the stored value in the authentic bill determination counter BILCNT is still "1" as previously set at step S130, so that the subroutine branches to step S145. At step S145, the value reserved in the register BKIN(0) (indicative of the denomination for which the inserted bill has been first determined to be authentic) is reset into the register KIN.

If any code indicative of another denomination approximate in pattern to the specific or first-authenticity-identified denomination is stored in the approximate denomination table at all, and when the inserted bill has been determined to be also authentic with the other denomination, an affirmative determination is made at step S137 now that the stored value in the authentic bill determination counter BILCNT is incremented at step S135, so that the subroutine goes to step S138. At step S138, the subroutine checks an approximate denomination flag FKINJI to see whether the flag FKINJI is instructing that the inserted bill should be returned when the bill has been determined to be authentic with respect to two or more denominations, i.e., when the bill has been determined to be of overlapping authenticity. If answered in the affirmative, the subroutine goes to step S146 in order to clear the register KIN to "0". In this case, step S85 of FIG. 10 determines that the stored value in the register KIN is other than "0" (NO determination), so that a false bill process is carried out at step S89.

If the flag FKINJI is instructing that an optimum one denomination should be selected when the bill has been determined to be authentic with respect to two or more denominations, a negative determination is made at step S138, the subroutine goes to step S139 in order to set the register MIN to the maximum value "999". At next step S140, the pointer KINCNT is reset to "0". At step S141 following step S140, a determination is made as to whether the totalized distance value currently stored in the register RISTOL(KINCNT) specified by the pointer KINCNT is smaller than the value currently stored in the register MIN. If answered in the affirmative at step S141, the totalized distance value currently stored in the register RISTOL (KINCNT) is stored into the register MIN, and the denomination code currently stored in the register BKIN(KINCNT) specified by the pointer KINCNT is set into the register KIN at step S142. By now, the totalized distance value, of the inserted bill, for the first-authenticity-identified denomination has been stored in the register RISTOL(0) through the operation of step S132, and the totalized distance value, of the inserted bill, for the next-authenticity-identified denomination has been stored in the register RISTOL(1) through the operation of step S135. Also, the code of the first-authenticity-identified denomination has been stored in the resister BKIN(0) through the operation of step S132, and the code of the next-authenticity-identified denomination has been stored in the register BKIN(1) through the operation of step S135.

After step S142, the subroutine moves on to step S143. If answered in the negative S141, the subroutine jumps over step S142 to step S143 in order to increment the stored value of the pointer KICNT by one.

At step S144 following step S143, it is ascertained whether the stored value in the pointer KICNT is equivalent to or greater than a value obtained by subtracting "1" from the stored value in the authentic bill determination counter BILCNT. If answered in the negative at step S144, the subroutine loops back to step S141 in order to repeat the operations at and after step S141. If, on the other hand, the stored value in the pointer KICNT is equivalent to or greater than the subtraction result as determined at step S144, the subroutine is brought to an end. If answered in the affirmative at step S144, a code indicative of one of the denominations for which the totalized distance value is smallest has been stored in the register KIN. Thus, one of the denominations for which the totalized distance value is smallest is judged as an optimum denomination of the authentic bill.

Referring back to FIG. 10, it is determined at step S85 whether the current stored value in the register KIN is other than "0". If answered in the affirmative at step S85, the routine goes to step S86 in order to carry out a predetermined authentic bill process, including counting of the amount of the inserted bill, assuming that the single denomination indicated by the code stored in the register KIN is an actual denomination of the bill.

The present invention is applicable not only to the bill identifying method based on the above-mentioned various processing, but also a bill identifying device designed to carry out the various processing and a storage medium storing a program run by a computer to execute the various processing.

Further, the present invention may be implemented as a method, device or storage medium comprising only a significant part of the above-mentioned various processing rather than all of the various processing.

Furthermore, the present invention may be implemented either by executing all the above-described operations from the creation of the identification standard data to the bill identification or validation based on the created standard data, or by executing only the creation of the identification standard data or the bill identification based on the created standard data.

Moreover, whereas the present invention achieves high-accuracy bill identification only on the basis of optically detected data, magnetically detected data may be used as necessary. Where the optical sensors are used, they may be of the reflection type that detects light reflected from a bill, rather than the transmission type.

Furthermore, the identification standard data as described above may include standard data for possible false or non-authentic bills as well as standard data for genuine or authentic bills so that any inserted bill falling in the conditions of the standard data for non-authentic bills is determined to be an non-authentic bill.

Moreover, it should be obvious that the principle of the present invention is applicable to validation of any other paper-like pieces than ordinary bills, such as securities, credit slips, checks and the like bearing printed designs, watermarks or the like on their surfaces.

In summary, the present invention arranged in the above-mentioned manner achieves high-accuracy identification or validation of paper-like pieces. Namely, with the arrangement that the paper-like piece validation is executed on the basis of an adjustment coefficient generated by use of a pattern average calculated by extracting printed designs on the piece and statistical standard data normalized to a standard average for each scan position data, the paper-like piece validation can be carried out in an extremely stable condition where various error factors, such as unevenness in degree of stains on the paper-like pieces and unique performance of the bill identifying device.

Particularly, whereas bills, such as U.S. dollar bills, presenting approximate patterns among various denominations, could not be validated accurately, the present invention achieves high-accuracy validation of such bills. In particular, validation using the "approximate denomination table" in accordance with the present invention should prove extremely effective when a bill has been determined to be authentic with respect to two or more denominations in an overlapping manner. Further, by the creation of the statistical standard data, the present invention can simultaneously satisfy demands for an increased bill acceptance rate and an increased false-bill elimination accuracy that were hard to achieve with the conventional techniques.

What is claimed is:

1. A paper-like piece identifying method comprising:
  a first step of detecting characteristics of a particular paper-like piece to be identified by use of a sensor, to provide detected data for a plurality of predetermined positions on the paper-like piece;
  a second step of converting the detected data for each of the predetermined positions into relative value data to a predetermined value;
  a third step of normalizing the relative value data by use of a predetermined normalization parameter, to thereby provide adjusted sample data for each of the predetermined positions; and
  a fourth step of statistically evaluating the adjusted sample data for each of the predetermined positions by use of a standard average and standard deviation previously set for each of the predetermined positions, to thereby identify the paper-like piece,
  wherein said second step includes a step of selecting, as the predetermined value, a minimum or maximum value from among the detected data for the predetermined positions, and the detected data for each of the predetermined positions is converted into relative value data to the selected minimum or maximum value.

2. A paper-like piece identifying method comprising:
  a first step of detecting characteristics of a particular paper-like piece to be identified by use of a sensor, to provide detected data for a plurality of predetermined positions on the paper-like piece;

a second step of converting the detected data for each of the predetermined positions into relative value data to a predetermined value;

a third step of normalizing the relative value data by use of a predetermined normalization parameter, to thereby provide adjusted sample data for each of the predetermined positions; and a fourth step of statistically evaluating the adjusted sample data for each of the predetermined positions by use of a standard average and standard deviation previously set for each of the predetermined positions, to thereby identify the paper-like piece, wherein said third step includes:

a step of calculating an average value of the relative value data for the predetermined positions;

a step of using, as the normalization parameter, a predetermined relative standard average relating to the average value of the relative value data, to calculate a ratio of the average value to the relative standard average as an adjustment coefficient; and a step of executing arithmetic operations for adjusting the relative value data for each of the predetermined positions to thereby provide the adjusted sample data for each of the predetermined positions.

3. A paper-like piece identifying method comprising:

a first step of detecting characteristics of a particular paper-like piece to be identified by use of a sensor, to provide detected data for a plurality of predetermined positions on the paper-like piece;

a second step of converting the detected data for each of the predetermined positions into relative value data to a predetermined value;

a third step of normalizing the relative value data by use of a predetermined normalization parameter, to thereby provide adjusted sample data for each of the predetermined positions; and a fourth step of statistically evaluating the adjusted sample data for each of the predetermined positions by use of a standard average and standard deviation previously set for each of the predetermined positions, to thereby identify the paper-like piece, wherein said third step includes:

a step of calculating an average value of the relative value data for the predetermined positions;

a step of using, as the normalization parameter, a predetermined relative standard average relating to the average value of the relative value data, to calculate a ratio of the average value to the relative standard average as an adjustment coefficient; and a step of executing arithmetic operations for adjusting the relative value data for each of the predetermined positions to thereby provide the adjusted sample data for each of the predetermined positions, and wherein a predetermined absolute standard average relating to an average value of the detected data for the predetermined positions is previously set as the predetermined normalization parameter, and wherein said step of executing arithmetic operations provides the adjusted sample data for each of the predetermined positions by multiplying the relative value data for each of the predetermined positions by the adjustment coefficient to provide a product for the position and adding a difference between the absolute standard average and relative standard average to the product.

4. A paper-like piece identifying method comprising:

a first step of detecting characteristics of a particular paper-like piece to be identified by use of a sensor, to provide detected data for a plurality of predetermined positions on the paper-like piece;

a second step of converting the detected data for each of the predetermined positions into relative value data to a predetermined value;

a third step of normalizing the relative value data by use of a predetermined normalization parameter, to thereby provide adjusted sample data for each of the predetermined positions; and a fourth step of statistically evaluating the adjusted sample data for each of the predetermined positions by use of a standard average and standard deviation previously set for each of the predetermined positions, to thereby identify the paper-like piece, wherein said fourth step includes:

a step of, for each of the predetermined positions, executing an arithmetic operation for dividing a difference between the adjusted sample data and the standard average by the standard deviation, to thereby convert the adjusted sample data into a normalized distance value; and a step of evaluating the normalized distance value for each of the predetermined positions in accordance with a predetermined determination standard, said predetermined determination standard comprising a limitary distance value to be used commonly for evaluation of each said normalized distance value for each of the predetermined positions.

5. A paper-like piece identifying method as recited in claim 4 wherein said step of evaluating the normalized distance value determines whether or not the normalized distance value for each of the predetermined positions satisfies a limitary condition defined by the limitary distance value.

6. A paper-like piece identifying method as recited in claim 4 which further comprises a fifth step of summing the normalized distance values for the predetermined positions provided by said fourth step to thereby provide a totalized distance value, and a sixth step of further identifying the paper-like piece by statistically evaluating the totalized distance value by use of previously set statistic standard data.

7. A paper-like piece identifying method as recited in claim 4 which further comprises a fifth step of summing the normalized distance values for the predetermined positions provided by said fourth step to thereby provide a totalized distance value, said fourth and fifth steps being each executed by use of a standard average and standard deviation relating to a plurality of types of paper-like piece, and a sixth step of, when the particular paper-like piece has been identified to be authentic with respect to two or more of the types in an overlapping manner, determining the particular paper-like piece to be authentic with respect to only one of the two or more types for which the totalized distance value is smallest.

8. A paper-like piece identifying method as recited in claim 4 wherein said fourth step is executed by use of standard averages and standard deviations relating to known authentic and false paper-like pieces of a predetermined type, and which further comprises a fifth step of, when the particular paper-like piece has been identified as satisfying conditions of both of the known authentic and false paper-like pieces, determining the particular paper-like piece to be false.

9. A paper-like piece identifying method as recited in claim 1 wherein said fourth step includes:
   a step of, for each of the predetermined positions, executing an arithmetic operation for dividing a difference between the adjusted sample data and the standard average by the standard deviation, to thereby convert the adjusted sample data into a normalized distance value;
   a step of summing the normalized distance values for the predetermined positions to thereby provide a totalized distance value, and
   a step of identifying the particular paper-like piece by statistically evaluating the totalized distance value by use of previously set statistic standard data.

10. A paper-like piece identifying method as recited in claim 9 wherein the statistic standard data comprises a single limitary distance value, and wherein said step of identifying the particular paper-like piece determines whether or not the totalized distance value satisfies a limitary condition defined by the limitary distance value.

11. A paper-like piece identifying method as recited in claim 10 wherein the limitary value is set on the basis of a predetermined totalized-distance-value standard average and predetermined totalized-distance-value standard deviation.

12. A paper-like piece identifying method comprising:
   a first step of detecting characteristics of a particular paper-like piece to be identified by use of a sensor, to provide detected data for a plurality of predetermined positions on the paper-like piece;
   a second step of converting the detected data for each of the predetermined positions into relative value data to a predetermined value, said second step including a step of selecting, as the predetermined value, a minimum or maximum value from among the detected data for the predetermined positions, and a step of converting said detected data for each of the predetermined positions into relative value data to the selected minimum or maximum value;
   a third step of normalizing the relative value data by use of a predetermined normalization parameter, to thereby provide adjusted sample data for each of the predetermined positions; and
   a fourth step of evaluating the adjusted sample data for each of the predetermined positions by use of predetermined standard data, to thereby identify the paper-like piece.

13. A paper-like piece identifying device comprising:
   a sensor that detects characteristics of a particular paper-like piece to be identified, to provide detected data for a plurality of predetermined positions on the paper-like piece;
   a memory storing therein various parameters for normalization;
   a first arithmetic operator section that converts the detected data for each of the predetermined positions into relative value data to a minimum or maximum value selected from among the detected data for the predetermined positions;
   a second arithmetic operator section that calculates an average value of the relative value data for the predetermined positions;
   a third arithmetic operator section that reads out, from said memory, a parameter of a predetermined relative standard average relating to the average value of the relative value data and executes an arithmetic operation for calculating an adjustment coefficient by dividing the relative standard average by the average value calculated by said second arithmetic operator section;
   a fourth arithmetic operator section that executes an arithmetic operation for adjusting the relative value data for each of the predetermined positions, provided by said first arithmetic operator section, by use of the adjustment coefficient, to thereby provide adjusted sample data for each of the predetermined positions;
   a fifth arithmetic operator section that reads out, from said memory, parameters of a standard average and standard deviation for each of the predetermined positions and executes, for each of the predetermined positions, an arithmetic operation for dividing by the standard deviation a difference between the adjusted sample data provided by said fourth arithmetic operator section and the standard average, to thereby convert the adjusted sample data into a normalized distance value; and
   an evaluator section that makes a comparison between the normalized distance value for each of the predetermined positions and a predetermined limitary standard value and evaluates the particular paper-like piece on the basis of a result of the comparison, said predetermined limitary standard value being used commonly for evaluation of each said normalized distance value for each of the predetermined positions.

14. A paper-like piece identifying device as recited in claim 13 wherein the predetermined limitary standard value used in said evaluator section is an adjustable value to permit adjustment of identification sensitivity of said paper-like piece identifying device.

15. A paper-like piece identifying device as recited in claim 13 which further comprises a sixth arithmetic operator section that sums the normalized distance values for the predetermined positions to thereby provide a totalized distance value, and a second evaluator section that further evaluates the paper-like piece by use of the totalized distance value provided by said sixth arithmetic operator section.

16. A paper-like piece identifying device as recited in claim 13 wherein said sensor comprises a plurality of optical sensors so that each of said optical sensors outputs detected data for a plurality of predetermined positions on the paper-like piece, said memory stores therein the various parameters in corresponding relations to said optical sensors, and each of said arithmetic operator sections and evaluator sections evaluates the particular paper-like piece for each of the optical sensors and validates the paper-like piece on the basis of a combination of evaluated results for each of the optical sensors.

17. A paper-like piece identifying device as recited in claim 13 wherein said memory stores therein the various parameters for a plurality of types of paper-like piece, said third to fifth arithmetic operator sections execute said arithmetic operations by use of the parameters for each of the types of paper-like piece, and each of said evaluator sections evaluates the particular paper-like piece by use of the limitary standard value for each of the types of paper-like piece.

18. A paper-like piece identifying device as recited in claim 17 which further comprises:
   a table prestoring information on a plurality of types of paper-like piece that are approximate to each other in characteristic; and a section that, when said evaluator sections judges that the particular paper-like piece corresponds to a particular one of the types, searches said table for any other of the types that is approximate to the particular type and further determines, by means of said third to fifth arithmetic operator sections and said evaluator sections, whether the particular paper-like piece also corresponds to the searched other type.

19. A paper-like piece identifying device comprising:

a sensor that detects characteristics of a particular paper-like piece to be identified, to provide detected data for a plurality of predetermined positions on the paper-like piece;

a memory storing therein various parameters for normalization;

a first arithmetic operator section that converts the detected data for each of the predetermined positions into relative value data to a predetermined value;

a second arithmetic operator section that reads out, from said memory, a normalization parameter, and executes an arithmetic operation for normalizing the relative value data by use of said normalization parameter read out from said memory, to thereby provide adjusted sample data for each of the predetermined positions;

a third arithmetic operator section that reads out, from said memory, parameters of a standard average and standard deviation for each of the predetermined positions and executes, for each of the predetermined positions, an arithmetic operation for dividing by the standard deviation a difference between the adjusted sample data and the standard average, to thereby convert the adjusted sample data into a normalized distance value; and an evaluator section that makes a comparison between the normalized distance value for each of the predetermined positions and a predetermined limitary standard value and evaluates the particular paper-like piece on the basis of a result of the comparison, said predetermined limitary standard value being used commonly for evaluation of each said normalized distance value for each of the predetermined positions.

20. A machine-readable recording medium containing a group of instructions of a paper-like piece identifying program to be executed by a computer, said paper-like piece identifying program comprising:

a first step of detecting characteristics of a particular paper-like piece to be identified by use of a sensor, to provide detected data for a plurality of predetermined positions on the paper-like piece, a second step of converting the detected data for each of the predetermined positions into relative value data to a predetermined value;

a third step of normalizing the relative value data by use of a predetermined normalization parameter, to thereby provide adjusted sample data for each of the predetermined positions; and a fourth step of statistically evaluating the adjusted sample data for each of the predetermined positions by use of a standard average and standard deviation previously set for each of the predetermined positions, to thereby identify the paper-like piece, wherein said second step includes a step of selecting, as the predetermined value, a minimum or maximum value from among the detected data for the predetermined positions, and the detected data for each of the predetermined positions is converted into relative value data to the selected minimum or maximum value.

21. A machine-readable recording medium containing a group of instructions of a paper-like piece identifying program to be executed by a computer, said paper-like piece identifying program comprising:

a first step of detecting characteristics of a particular paper-like piece to be identified by use of a sensor, to provide detected data for a plurality of predetermined positions on the paper-like piece;

a second step of converting the detected data for each of the predetermined positions into relative value data to a predetermined value, said second step including a step of selecting, as the predetermined value, a minimum or maximum value from among the detected data for the predetermined positions, and a step of converting said detected data for each of the predetermined positions into relative value data to the selected minimum or maximum value;

a third step of normalizing the relative value data by use of a predetermined normalization parameter, to thereby provide adjusted sample data for each of the predetermined positions; and a fourth step of evaluating the adjusted sample data for each of the predetermined positions by use of predetermined standard data, to thereby identify the paper-like piece.

22. A machine-readable recording medium containing a group of instructions of a paper-like piece identifying program to be executed by a computer, the computer being connected with a sensor for detecting characteristics of a particular paper-like piece to be identified to provide detected data for a plurality of predetermined positions on the paper-like piece and a memory storing various parameters for normalization, said paper-like piece identifying program comprising:

a first arithmetic operation step of converting the detected data for each of the predetermined positions, provided by the sensor, into relative value data to a minimum or maximum value selected from among the detected data for the predetermined positions;

a second arithmetic operation step of calculating an average value of the relative value data for the predetermined positions;

a third arithmetic operation step of reading out, from the memory, a parameter of a predetermined relative standard average relating to the average value of the relative value data and executing an arithmetic operation for calculating an adjustment coefficient by dividing the relative standard average by the average value calculated by said second arithmetic operation step;

a fourth arithmetic operation step of executing an arithmetic operation for adjusting the relative value data for each of the predetermined positions, provided by said first arithmetic operation step, by use of the adjustment coefficient, to thereby provide adjusted sample data for each of the predetermined positions;

a fifth arithmetic operation step of reading out, from the memory, parameters of a standard average and standard deviation for each of the predetermined positions and executing, for each of the predetermined positions, an arithmetic operation for dividing by the standard deviation a difference between the adjusted sample data provided by said fourth arithmetic operation step and the standard average, to thereby convert the adjusted sample data into a normalized distance value; and an evaluation step of making a comparison between the normalized distance value for each of the predetermined positions and a predetermined limitary standard value and evaluating the particular paper-like piece on the basis of a result of the comparison, said predetermined limitary standard value being used commonly for evaluation of each said normalized distance value for each of the predetermined positions.

23. A paper-like piece identifying method comprising the steps of:

- detecting characteristics of a same type of sample paper-like pieces under various conditions, to thereby collect a multiplicity of detected characteristic data for a plurality of predetermined positions on the sample paper-like pieces;
- converting the detected characteristic data for each of the predetermined positions on one of the sample paper-like pieces into relative value data to a minimum or maximum value selected from among the detected characteristic data for the predetermined positions on said one of the sample paper-like pieces;
- creating a position standard average and position standard deviation of the detected characteristic data for each of the predetermined positions, on the basis of said relative value data converted by said step of converting in correspondence with the detected characteristic data collected by said step of detecting;
- for each of the predetermined positions, obtaining, by simulation, a limitary value of standardization variable of the detected characteristic data defined by the position standard average and position standard deviation and then defining the limitary value of standardization variable as a determination standard value;
- detecting characteristics of a particular paper-like piece to be identified, to provide detected data for each of predetermined positions on the particular paper-like piece;
- selecting a minimum or maximum value from among the detected data for each of the predetermined positions on the particular paper-like piece;
- converting the detected data for each of the predetermined positions on the particular paper-like piece into relative value data to the minimum or maximum value selected by said step of selecting;
- standardizing the relative value data corresponding to the detected data for each of the predetermined positions on the particular paper-like piece by dividing a difference of the relative value data from the position standard average by the position standard deviation, for each of the predetermined positions; and
- for each of the predetermined positions, evaluating the standardized relative value data by use of the determination standard value.

24. A paper-like piece identifying method as recited in claim 23 wherein said step of creating a position standard average and position standard deviation includes:

- a step of, for each of the sample paper-like pieces, calculating an arithmetic mean of said relative value data converted by said step of converting the detected characteristic data;
- a step of calculating a relative-value standard average from the arithmetic mean of each of the sample paper-like pieces;
- a step of calculating a ratio of the arithmetic mean of each of the sample paper-like pieces to the relative-value standard average to provide an adjustment coefficient for each of the sample paper-like pieces;
- a step of adjusting said relative value data converted by said step of converting the detected characteristic data by use of the adjustment coefficient, for each of the sample paper-like pieces; and
- a step of calculating the position standard average and position standard deviation for each of the predetermined positions on the basis of the relative value data adjusted by said step of adjusting.

25. A paper-like piece identifying method as recited in claim 23 wherein said step of standardizing the relative value data includes:

- a step of calculating an arithmetic mean of said relative value data converted by said step of converting the detected data;
- a step of calculating a ratio of the arithmetic mean of said relative value data converted by said step of converting the detected data to the relative-value standard average to provide an adjustment coefficient;
- a step of adjusting said relative value data converted by said step of converting the detected data by use of the adjustment coefficient, to thereby provide adjusted relative value data; and
- a step of standardizing the relative value data by dividing a difference of the adjusted relative value data from the position standard average by the position standard deviation, for each of the predetermined positions.

26. A paper-like piece identifying device comprising:

- a sensor that detects characteristics of a particular paper-like piece to be identified, to provide detected data for a plurality of predetermined positions on the paper-like piece;
- a memory storing therein various parameters for normalization;
- a first arithmetic operator section that converts the detected data for each of the predetermined positions into relative value data to a predetermined value;
- a second arithmetic operator section that calculates an average value of the relative value data for the predetermined positions;
- a third arithmetic operator section that reads out, from said memory, a parameter of a predetermined relative standard average relating to the average value of the relative value data and executes an arithmetic operation for calculating an adjustment coefficient by dividing the relative standard average by the average value calculated by said second arithmetic operator section;
- a fourth arithmetic operator section that executes an arithmetic operation for adjusting the relative value data for each of the predetermined positions, provided by said first arithmetic operator section, by use of the adjustment coefficient, to thereby provide adjusted sample data for each of the predetermined positions; and
- an evaluator section that reads out, from said memory, parameters of a standard average and standard deviation for each of the predetermined positions and executes, for each of the predetermined positions, and statistically evaluates the adjusted sample data for each of the predetermined positions by use of the standard average and standard deviation for each of the predetermined positions, to thereby identify the paper-like piece, wherein said fourth arithmetic operator section reads out, from said memory, a predetermined absolute standard average relating to an average value of the detected data for the predetermined positions, and provides the adjusted sample data for each of the predetermined positions by multiplying the relative value data for each of the predetermined positions by the adjustment coefficient to provide a product for the position and adding a difference between the absolute standard average and relative standard average to the product.

27. A machine-readable storage medium containing a group of instructions to cause said machine to perform a method of identifying a paper-like piece, said method comprising:

a first step of detecting characteristics of a particular paper-like piece to be identified by use of a sensor, to provide detected data for a plurality of predetermined positions on the paper-like piece;

a second step of converting the detected data for each of the predetermined positions into relative value data to a predetermined value;

a third step of normalizing the relative value data by use of a predetermined normalization parameter, to thereby provide adjusted sample data for each of the predetermined positions; and a fourth step of statistically evaluating the adjusted sample data for each of the predetermined positions by use of a standard average and standard deviation previously set for each of the predetermined positions, to thereby identify the paper-like piece, wherein said third step includes:

a step of calculating an average value of the relative value data for the predetermined positions;

a step of using, as the normalization parameter, a predetermined relative standard average relating to the average value of the relative value data, to calculate a ratio of the average value to the relative standard average as an adjustment coefficient; and a step of executing arithmetic operations for adjusting the relative value data for each of the predetermined positions to thereby provide the adjusted sample data for each of the predetermined positions, and wherein a predetermined absolute standard average relating to an average value of the detected data for the predetermined positions is previously set as the predetermined normalization parameter, and wherein said step of executing arithmetic operations provides the adjusted sample data for each of the predetermined positions by multiplying the relative value data for each of the predetermined positions by the adjustment coefficient to provide a product for the position and adding a difference between the absolute standard average and relative standard average to the product.

* * * * *